United States Patent
Belleschi et al.

(10) Patent No.: US 10,499,318 B2
(45) Date of Patent: *Dec. 3, 2019

(54) PROVISIONING TRANSMISSION POOLS FOR INTER-CARRIER PROSE DIRECT DISCOVERY

(71) Applicant: TELEFONAKTIEBOLAGET LM ERICSSON (PUBL), Stockholm (SE)

(72) Inventors: Marco Belleschi, Solna (SE); Mats Folke, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,500

(22) Filed: Feb. 4, 2019

(65) Prior Publication Data

US 2019/0182753 A1 Jun. 13, 2019

Related U.S. Application Data

(63) Continuation of application No. 15/232,985, filed on Aug. 10, 2016, now Pat. No. 10,237,809.

(Continued)

(51) Int. Cl.
*H04W 48/10* (2009.01)
*H04L 29/08* (2006.01)
(Continued)

(52) U.S. Cl.
CPC .......... *H04W 48/10* (2013.01); *H04L 5/0094* (2013.01); *H04L 5/1469* (2013.01); *H04L 67/16* (2013.01);
(Continued)

(58) Field of Classification Search
CPC . H04L 67/16; H04L 5/14; H04L 5/00; H04W 48/10; H04W 76/14;
(Continued)

(56) References Cited

U.S. PATENT DOCUMENTS

| 10,237,809 B2 * | 3/2019 | Belleschi | H04L 67/16 |
| 2014/0301372 A1 * | 10/2014 | Fukuta | H04W 16/32 370/332 |

(Continued)

OTHER PUBLICATIONS

ZTE: "Discussion on discovery enhancements". 3GPP Draft; R1-151723 Discovery Enhancements. 3rd Generation Partnership Project (3GPP). Mobile Competence Centre; 650. Route Des Lucioles ; F-06921 Sophia-Antipolis Cedex ; France vol. RAN WG1. No. Belgrade. Serbia; Apr. 20, 2015-Apr. 24, 2015. Apr. 19, 2015 (Apr. 19, 2015).

(Continued)

*Primary Examiner* — Maharishi V Khirodhar
*Assistant Examiner* — Kenneth P Hunt

(57) ABSTRACT

A method in a wireless device is disclosed. The method comprises receiving one or more resource pool configurations for a particular discovery carrier, the one or more resource pool configurations comprising information indicating one or more of resource elements and subframes that the wireless device should use to monitor for incoming discovery messages and transmit outgoing discovery messages, the received one or more resource pool configurations comprising at least a first resource pool configuration received from a serving network node of the wireless device operating in Time Division Duplex (TDD) mode. The method comprises determining which of the received one or more resource pool configurations that the wireless device should use to monitor for incoming discovery messages and transmit outgoing discovery messages.

10 Claims, 10 Drawing Sheets

Related U.S. Application Data

(60) Provisional application No. 62/205,363, filed on Aug. 14, 2015.

(51) Int. Cl.
| | | |
|---|---|---|
| *H04L 5/00* | (2006.01) | |
| *H04L 5/14* | (2006.01) | |
| *H04W 72/12* | (2009.01) | |
| *H04W 76/14* | (2018.01) | |
| *H04W 88/06* | (2009.01) | |
| *H04H 20/38* | (2008.01) | |
| *H04W 8/00* | (2009.01) | |
| *H04W 48/12* | (2009.01) | |

(52) U.S. Cl.
CPC ............ *H04W 76/14* (2018.02); *H04H 20/38* (2013.01); *H04W 8/005* (2013.01); *H04W 48/12* (2013.01); *H04W 88/06* (2013.01)

(58) Field of Classification Search
CPC . H04W 72/1215; H04W 48/12; H04W 88/06; H04W 8/005; H04H 20/38
See application file for complete search history.

(56) References Cited

U.S. PATENT DOCUMENTS

| | | |
|---|---|---|
| 2015/0043398 A1 | 2/2015 | Fwu et al. |
| 2015/0043448 A1 | 2/2015 | Chatterjee et al. |
| 2015/0237549 A1* | 8/2015 | Deivasigamani ..... H04W 36/08 370/331 |
| 2016/0183167 A1* | 6/2016 | Agiwal ............... H04W 72/042 370/329 |
| 2016/0269885 A1 | 9/2016 | Kim et al. |
| 2017/0013598 A1* | 1/2017 | Jung ..................... H04W 72/02 |
| 2017/0048786 A1* | 2/2017 | Belleschi ................ H04L 67/16 |
| 2017/0048822 A1* | 2/2017 | Lee ........................ H04W 72/02 |
| 2017/0055265 A1* | 2/2017 | Wei ................... H04W 72/0453 |
| 2017/0135074 A1* | 5/2017 | Yi ......................... H04W 8/005 |
| 2018/0020339 A1* | 1/2018 | Agiwal ................. H04W 76/14 |

OTHER PUBLICATIONS

ETSI TS 136 331 v12.6.0 (Jul. 2015) LTE; Evolved Universal Terrestrial Radio Access (E-UTRA); Radio Resource Control (RRC); Protocol specification (3GPP TS 36.331 version 12.6.0 Release 12), 582 pages, Jul. 2015.

* cited by examiner

PROVISIONING TRANSMISSION POOLS FOR INTER-CARRIER PROSE DIRECT DISCOVERY

PRIORITY

This application is a continuation of U.S. patent application Ser. No. 15/232,985 filed on Aug. 10, 2016, now U.S. Pat. No. 10,237,809 B2, which claims the benefit of U.S. Provisional Application 62/205,363 filed on Aug. 14, 2015, the entire disclosures of which are hereby incorporated by reference.

TECHNICAL FIELD

The present disclosure relates, in general, to wireless communications and, more particularly, to provisioning transmission pools for inter-carrier ProSe direct discovery.

BACKGROUND

In device-to-device (D2D) communications, user equipment (UEs) in proximity of each other can establish a direct radio link to communicate. For this reason, this technology is also known as LTE direct in the literature or as Proximity Service (ProSe) in the 3rd Generation Partnership Project (3GPP) standardization body.

Exploiting a D2D link may allow for very high bit rates, low delays and low power consumption. This makes D2D technology amenable to new types of wireless peer-to-peer services. End-users are increasingly interested in sharing content and/or services with other users in their surroundings, and in establishing peer-to-peer connections to exchange large amounts of data, share interests and applications, and other similar activities. D2D technology also has applications in the fields of national security and public safety. This is because D2D technology may, for example, allow network connectivity to remote UEs in disaster areas via public safety dispatchers (e.g., police, fire brigades, ambulances, etc.) while enjoying the benefits of broadband capabilities.

A basic requirement for network nodes supporting D2D communications is that they should be able to coexist with legacy RAN nodes as the D2D feature is gradually introduced into the existing RAN infrastructure. Consequently, D2D-related functionalities should be implemented taking into account existing LTE infrastructure that can assist D2D UEs in establishing a reliable and secure D2D radio link layer that can coexist with the ordinary cellular link layer. Certainly, D2D communications can also happen in an ad-hoc and autonomous fashion in case the cellular network is damaged, or if D2D-capable UEs do not have network coverage.

D2D-type communication was first standardized under the umbrella of 3GPP in Release 12. In Release 12, the 3GPP standardization body distinguishes between two different types of services: ProSe Direct Communication and ProSe Direct Discovery. In ProSe Direct Communication, UEs in proximity of each other establish a direct user plane connection. In ProSe Direct Discovery, UEs transmit in broadcast and monitor discovery announcements to become aware of the type of content and/or service each UE can share in D2D fashion, as well as the proximity between each other. Enhanced D2D-related features are currently under standardization in 3GPP Release 13. These enhancements include enabling UE-to-Network relay, support for D2D discovery in multiple carriers and out-of-coverage carriers, QoS and priorities aspects.

For ProSe Direct Communication, two different operative modes are specified in 3GPP: mode 1 and mode 2. In mode 1, a UE in RRC_CONNECTED mode requests D2D resources and the eNodeB (eNB) grants them via Physical Downlink Control Channel (PDCCH) (DCIS). This is similar to what happens for cellular uplink (UL) grants. In mode 2, a UE autonomously selects resources for transmission from a pool of available resources that the eNB provides in broadcast via Session Information Block (SIB) 18 (SIB18) for transmissions on carriers other than the Primary Cell (PCell) or via dedicated signaling for transmission on the PCell.

Mode 1 provides a more accurate scheduling from the eNB that can better control the resources actually used for ProSe communication. Mode 1 also provides the UE with a less-interfered resource allocation. Mode 2, on the other hand, requires less implementation complexity and less signaling from the eNB at the expense of possible higher interference. In addition, Mode 1 is only applicable to UEs in RRC_CONNECTED, while mode 2 communications can also be performed by UEs in RRC_IDLE.

Regardless of the mode employed, ProSe communication takes place in the Physical Sidelink Shared Channel (PSSCH) during the so-called SC period. The characteristics of the PSSCH (e.g., length, System Frame Number (SFN) offset, etc.) are signaled by the ProSe discovery carriers. Within the SC period, each PSSCH transmission is preceded by the Scheduling Assignment (SA) period, which takes place in a dedicated Physical Sidelink Control Channel (PSCCH). In the PSCCH, transmitting UEs inform other UEs in the surrounding area on parameters of the following PSSCH data transmission, including Physical Resource Blocks (PRBs), time pattern, and modulation and coding scheme (MCS) parameters. This information helps monitoring UEs correctly perform decoding.

For ProSe Direct Discovery, two different operative modes are specified in 3GPP: type 1 and type 2B. Similar to mode 1 communication in ProSe Direct Communication, in type 2B discovery the eNB provides grants via dedicated Radio Resource Control (RRC) signaling. Similar to mode 2 communication in ProSe Direct Communication, in type 1 discovery a UE autonomously selects discovery resources. These discovery resources are provided either via dedicated signaling for UEs in the PCell and in RRC_CONNECTED, or acquired from SIB19 for UEs that are in RRC_IDLE. More specifically, in type 1 discovery the network provides one or more resource pools. Each resource pool is characterized by a set of PRBs and subframes in which discovery can actually take place. The UE then autonomously selects one of such pools either randomly or on the basis of Reference Signal Received Power (RSRP) measurements related to the different pools. Not all of the resources available in the discovery pool, however, are ultimately used for discovery (i.e., the exact time/frequency resources to use within the pool are selected randomly, and each resource has an equal probability of being selected). In particular, transmission of a discovery Medium Access Control (MAC) Protocol Data Unit (PDU) takes place in one subframe and two PRBs.

In some cases, discovery messages are transmitted in the Physical Downlink Shared Channel (PDSCH) during the discovery period. The PDSCH configuration (e.g., length, SFN offset, etc.) is provided as part of the resource pool configuration. To this end, the subframes within the discovery period that can potentially be used for discovery transmission (or retransmission) are signaled via a bitmap. Within the bitmap, 0 and 1 indicate that this specific subframe is allowed for transmission or is not allowed for transmission, respectively. As described above, the UE has to select one of such subframes and two PRBs for transmission of a discovery message. Each pool may be configured with different bitmap values and bitmap lengths, and can be repeated for a maximum of 5 times within the discovery period. A discovery message can also be retransmitted within the pool using a different puncturing of the encoder according to the principles of soft combining.

A fundamental property of wireless communication is the fact that constructing a device which can send and transmit on the same frequency at the same time is prohibitively expensive. Instead, various duplex schemes are used. One example duplex scheme is Frequency Division Duplex (FDD). FDD uses two carriers separated by a certain number of MHz. This allows a device to transmit on one carrier (the uplink (UL) carrier) and receive on another (the downlink (DL) carrier) at the same time. Thus, a carrier designated for FDD consists of two carriers (one UL and one DL), and are referred to as paired carriers. If the UE knows the frequency of a UL (or DL) carrier, it also knows the corresponding paired DL (or UL) carrier frequency.

Another example duplex scheme is Time Division Duplex (TDD). TDD uses only one carrier, which is divided in time creating slots. Some slots are used for transmission (uplink subframes) and others are used for reception (downlink subframes).

D2D on a FDD carrier by design only uses the uplink carrier. In other words, UEs both transmit and receive on the uplink carrier.

Release 13 does not limit ProSe discovery carrier transmission to the PCell. ProSe discovery transmission can take place in any carrier, including, for example, a Secondary Cell (SCell), a non-serving carrier, a carrier belonging to another eNB (or even to another Public Land Mobile Network (PLMN)), or a preconfigured carrier that is used for public safety operations. Resource configurations for transmitting and monitoring on a non-PCell carrier can be provided in a variety of ways. For example, in cases where TDD mode is used, resource configurations for transmitting and monitoring on a non-PCell carrier can be provided either by the carrier itself via broadcast signaling (e.g., system information such as SIB19) or via a serving cell in the serving eNB with dedicated signaling or broadcast signaling. As another example, in cases where FDD mode is used, resource configurations for transmitting and monitoring on a non-PCell carrier can be provided either by a paired carrier associated with a particular discovery carrier via broadcast signaling (e.g., system information such as SIB19) or via a serving cell in the serving eNB with dedicated signaling or broadcast signaling.

This implies that coordination between different eNBs or different PLMNs should be supported to allow the serving eNB to provide resource configurations for transmitting and/or monitoring on other carriers that do not belong to the serving eNB to which the UE is connected or on which the UE is camping.

SUMMARY

To address the foregoing problems with existing approaches, disclosed is a method in a wireless device. The method comprises receiving one or more resource pool configurations for a particular discovery carrier, the one or more resource pool configurations comprising information indicating one or more of resource elements and subframes that the wireless device should use to monitor for incoming discovery messages and transmit outgoing discovery messages, the received one or more resource pool configurations comprising at least a first resource pool configuration received from a serving network node of the wireless device operating in Time Division Duplex (TDD) mode. The method comprises determining which of the received one or more resource pool configurations that the wireless device should use to monitor for incoming discovery messages and transmit outgoing discovery messages.

In certain embodiments, the method may comprise determining whether the received one or more resource pool configurations for the particular discovery carrier include a second resource pool configuration received via system information of the particular discovery carrier. The method may comprise upon determining that the received one or more resource pool configurations for the particular discovery carrier includes the second resource pool configuration received via system information of the particular discovery carrier, using the second resource pool configuration to monitor for incoming discovery messages and transmit outgoing discovery messages.

In certain embodiments, the method may comprise determining whether the particular discovery carrier contains system information. The method may comprise upon determining that the particular discovery carrier does not contain system information, determining whether the wireless device is located at a cell edge between in-coverage and out-of-coverage for the particular discovery carrier. The method may comprise upon determining that the wireless device is not located at a cell edge between in-coverage and out-of-coverage for the particular discovery carrier, determining that the first resource pool configuration received from the serving network node of the wireless device should not be used to monitor for incoming discovery messages and transmit outgoing discovery messages. The method may comprise upon determining that the wireless device is located at a cell edge between in-coverage and out-of-coverage for the particular discovery carrier, using the first resource pool configuration received from the serving network node of the wireless device to monitor for incoming discovery messages and transmit outgoing discovery messages. Determining whether the wireless device is located at the cell edge between in-coverage and out-of-coverage for the particular discovery carrier may be based on at least one of: whether system information is not received by the wireless device for a first duration; and whether an S-criterion used to determine when the UE is out-of-coverage or in-coverage with respect to the particular discovery carrier is not fulfilled for a second duration.

In certain embodiments, the method may comprise determining whether system information of the particular discovery carrier is broadcast. The method may comprise upon determining that system information of the particular discovery carrier is not broadcast, using the first resource pool configuration received from the serving network node of the wireless device to monitor for incoming discovery messages and transmit outgoing discovery messages. The method may comprise receiving an indication from the serving network node that the particular discovery carrier does not support system information. The method may comprise upon determining that system information of the particular discovery carrier is broadcast, determining whether the system information of the particular discovery carrier includes a second resource pool configuration. The method may comprise upon determining that the system information of the particular discovery carrier does not include the second resource pool configuration, using the first resource pool configuration received from the serving network node of the wireless device to monitor for incoming discovery messages and transmit outgoing discovery messages.

Also disclosed is a wireless device. The wireless device comprises one or more processors. The one or more processors are configured to receive one or more resource pool configurations for a particular discovery carrier, the one or more resource pool configurations comprising information indicating one or more of resource elements and subframes that the wireless device should use to monitor for incoming discovery messages and transmit outgoing discovery messages, the received one or more resource pool configurations comprising at least a first resource pool configuration received from a serving network node of the wireless device operating in Time Division Duplex (TDD) mode. The one or more processors are configured to determine which of the received one or more resource pool configurations that the wireless device should use to monitor for incoming discovery messages and transmit outgoing discovery messages.

Also disclosed is a method in a network node. The method comprises determining a first resource pool configuration for a particular discovery carrier, the first resource pool configuration comprising information indicating one or more of resource elements and subframes that a wireless device operating in Time Division Duplex (TDD) mode should use to monitor for incoming discovery messages and transmit outgoing discovery messages. The method comprises communicating the first resource pool configuration to the wireless device. The method comprises configuring the wireless device to use one of the first resource pool configuration or a second resource pool configuration communicated via system information of the particular discovery carrier.

In certain embodiments, configuring the wireless device to use one of the first resource pool configuration or the second resource pool configuration may comprise configuring the wireless device to use the second resource pool configuration to monitor for incoming discovery messages and transmit outgoing discovery messages if the wireless device receives both the first resource pool configuration and the second resource pool configuration.

In certain embodiments, configuring the wireless device to use one of the first resource pool configuration or the second resource pool configuration may comprise configuring the wireless device to not use the first resource pool configuration to monitor for incoming discovery messages and transmit outgoing discovery messages if the particular discovery carrier does not contain system information and the wireless device is not located at a cell edge between in-coverage and out-of-coverage for the particular discovery carrier. In certain embodiments, configuring the wireless device to use one of the first resource pool configuration or the second resource pool configuration may comprise configuring the wireless device to use the first resource pool configuration to monitor for incoming discovery messages and transmit outgoing discovery messages if the particular discovery carrier does not contain system information and the wireless device is located at a cell edge between in-coverage and out-of-coverage for the particular discovery carrier.

In certain embodiments, configuring the wireless device to use one of the first resource pool configuration or the second resource pool configuration may comprise configuring the wireless device to use the first resource pool configuration to monitor for incoming discovery messages and transmit outgoing discovery messages if system information of the particular discovery carrier is not broadcast. The method may comprise communicating an indication to the wireless device that the particular discovery carrier does not support system information. In certain embodiments, configuring the wireless device to use one of the first resource pool configuration or the second resource pool configuration may comprise configuring the wireless device to use the first resource pool configuration to monitor for incoming discovery messages and transmit outgoing discovery messages if the system information of the particular discovery carrier is broadcast but does not include the second resource pool configuration.

Also disclosed is a network node. The network node comprises one or more processors. The one or more processors are configured to determine a first resource pool configuration for a particular discovery carrier, the first resource pool configuration comprising information indicating one or more of resource elements and subframes that a wireless device operating in Time Division Duplex (TDD) mode should use to monitor for incoming discovery messages and transmit outgoing discovery messages. The one or more processors are configured to communicate the first resource pool configuration to the wireless device. The one or more processors are configured to configure the wireless device to use one of the first resource pool configuration or a second resource pool configuration communicated via system information of the particular discovery carrier.

Also disclosed is a method in a wireless device. The method comprises receiving one or more resource pool configurations for a particular discovery carrier, the one or more resource pool configurations comprising information indicating one or more of resource elements and subframes that the wireless device should use to monitor for incoming discovery messages and transmit outgoing discovery messages, the received one or more resource pool configurations comprising at least a first resource pool configuration received from a serving network node of the wireless device operating in Frequency Division Duplex Mode (FDD) mode. The method comprises determining which of the received one or more resource pool configurations that the wireless device should use to monitor for incoming discovery messages and transmit outgoing discovery messages.

In certain embodiments, the method may comprise determining whether the received one or more resource pool configurations for the particular discovery carrier includes a second resource pool configuration received via system information of a paired carrier associated with the particular discovery carrier. The method may comprise upon determining that the received one or more resource pool configurations for the particular discovery carrier includes the second resource pool configuration received via system information of the paired carrier associated with the particular discovery carrier, using the second resource pool configuration to monitor for incoming discovery messages and transmit outgoing discovery messages.

In certain embodiments, the method may comprise determining whether the paired carrier associated with the particular discovery carrier contains system information. The method may comprise upon determining that the paired carrier associated with the particular discovery carrier does not contain system information, determining whether the wireless device is located at a cell edge between in-coverage and out-of-coverage for the particular discovery carrier. The method may comprise upon determining that the wireless device is not located at a cell edge between in-coverage and out-of-coverage for the particular discovery carrier, determining that the first resource pool configuration received from the serving network node of the wireless device should not be used to monitor for incoming discovery messages and transmit outgoing discovery messages. The method may comprise upon determining that the wireless device is located at a cell edge between in-coverage and out-of-coverage for the particular discovery carrier, using the first resource pool configuration received from the serving network node of the wireless device to monitor for incoming discovery messages and transmit outgoing discovery messages. Determining whether the wireless device is located at the cell edge between in-coverage and out-of-coverage for the particular discovery carrier may be based on at least one of: whether system information is not received by the wireless device for a first duration; and whether an S-criterion used to determine when the wireless device is out-of-coverage or in-coverage with respect to the particular discovery carrier is not fulfilled for a second duration.

In certain embodiments, the method may comprise determining whether system information of a paired carrier associated with the particular discovery carrier is broadcast. The method may comprise upon determining that system information of the paired carrier associated with the particular discovery carrier is not broadcast, using the first resource pool configuration received from the serving network node of the wireless device to monitor for incoming discovery messages and transmit outgoing discovery messages. The method may comprise receiving an indication from the serving network node that the paired carrier associated with the particular discovery carrier does not support system information. The method may comprise upon determining that system information of the paired carrier associated with the particular discovery carrier is broadcast, determining whether the system information of the paired carrier associated with the particular discovery carrier includes a second resource pool configuration. The method may comprise upon determining that the system information of the paired carrier associated with the particular discovery carrier does not include the second resource pool configuration, using the first resource pool configuration received from the serving network node of the wireless device to monitor for incoming discovery messages and transmit outgoing discovery messages.

Also disclosed is a wireless device. The wireless device comprises one or more processors. The one or more processors are configured to receive one or more resource pool configurations for a particular discovery carrier, the one or more resource pool configurations comprising information indicating one or more of resource elements and subframes that the wireless device should use to monitor for incoming discovery messages and transmit outgoing discovery messages, the received one or more resource pool configurations comprising at least a first resource pool configuration received from a serving network node of the wireless device operating in Frequency Division Duplex Mode (FDD) mode. The one or more processors are configured to determine which of the received one or more resource pool configurations that the wireless device should use to monitor for incoming discovery messages and transmit outgoing discovery messages.

Also disclosed is a method in a network node. The method comprises determining a first resource pool configuration for a particular discovery carrier, the first resource pool configuration comprising information indicating one or more of resource elements and subframes that a wireless device operating in Frequency Division Duplex (FDD) mode should use to monitor for incoming discovery messages and transmit outgoing discovery messages. The method comprises communicating the first resource pool configuration to the wireless device. The method comprises configuring the wireless device to use one of the first resource pool configuration or a second resource pool configuration communicated via system information of a paired carrier associated with the particular discovery carrier.

In certain embodiments, configuring the wireless device to use one of the first resource pool configuration or the second resource pool configuration may comprise configuring the wireless device to use the second resource pool configuration to monitor for incoming discovery messages and transmit outgoing discovery messages if the wireless device receives both the first resource pool configuration and the second resource pool configuration.

In certain embodiments, configuring the wireless device to use one of the first resource pool configuration or the second resource pool configuration may comprise configuring the wireless device to not use the first resource pool configuration to monitor for incoming discovery messages and transmit outgoing discovery messages if the paired carrier associated with the particular discovery carrier does not contain system information and the wireless device is not located at a cell edge between in-coverage and out-of-coverage for the particular discovery carrier. In certain embodiments, configuring the wireless device to use one of the first resource pool configuration or the second resource pool configuration may comprise configuring the wireless device to use the first resource pool configuration to monitor for incoming discovery messages and transmit outgoing discovery messages if the paired carrier associated with the particular discovery carrier does not contain system information and the wireless device is located at a cell edge between in-coverage and out-of-coverage for the particular discovery carrier.

In certain embodiments, configuring the wireless device to use one of the first resource pool configuration or the second resource pool configuration may comprise configuring the wireless device to use the first resource pool configuration to monitor for incoming discovery messages and transmit outgoing discovery messages if system information of the paired carrier associated with the particular discovery carrier is not broadcast. The method may comprise communicating an indication to the wireless device that the paired carrier associated with the particular discovery carrier does not support system information. In certain embodiments, configuring the wireless device to use one of the first resource pool configuration or the second resource pool configuration may comprise configuring the wireless device to use the first resource pool configuration to monitor for incoming discovery messages and transmit outgoing discovery messages if the system information of the paired carrier associated with the particular discovery carrier is broadcast but does not include the second resource pool configuration.

Also disclosed is a network node. The network node comprises one or more processors. The one or more processors are configured to determine a first resource pool configuration for a particular discovery carrier, the first resource pool configuration comprising information indicating one or more of resource elements and subframes that a wireless device operating in Frequency Division Duplex (FDD) mode should use to monitor for incoming discovery messages and transmit outgoing discovery messages. The one or more processors are configured to communicate the first resource pool configuration to the wireless device. The one or more processors are configured to configure the wireless device to use one of the first resource pool configuration or a second resource pool configuration communicated via system information of a paired carrier associated with the particular discovery carrier.

Certain embodiments of the present disclosure may provide one or more technical advantages. For example, certain embodiments may advantageously avoid wireless device misbehavior when the wireless device receives concurrent and different resource pool provisioning from different sources for transmission/reception applicable to the same discovery carriers. As another example, certain embodiments may reduce the amount of signaling that needs to be sent over the air, which may advantageously allow a wireless device to save battery because it does not need to continuously monitor system information from the particular discovery carrier. As still another example, the various embodiments described herein may be implemented in both systems using TDD and systems using FDD. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
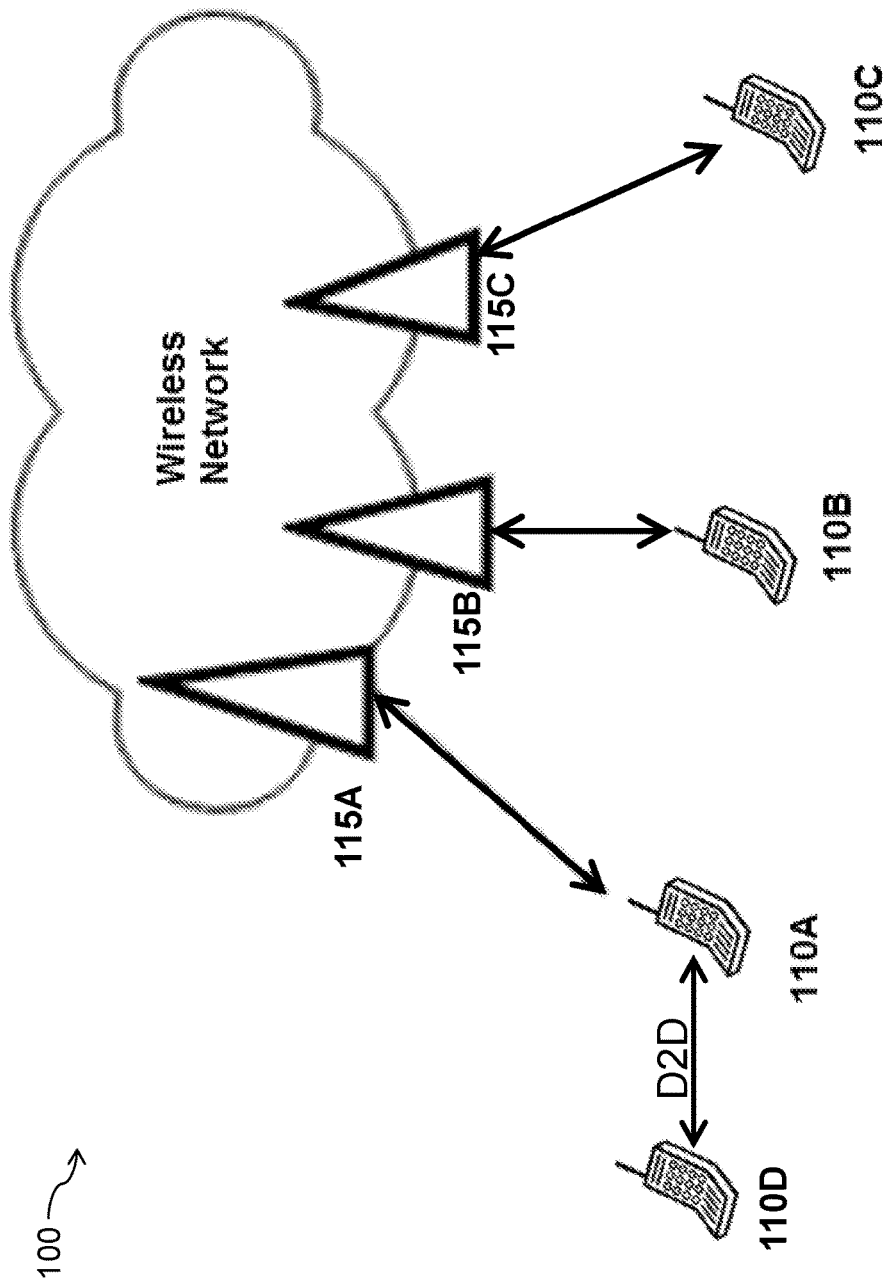
FIG. 1 is a block diagram illustrating an embodiment of a network, in accordance with certain embodiments.

As described above, ProSe discovery carrier transmission is not limited to the PCell, and can take place in any carrier (e.g., an SCell, a non-serving carrier, a carrier belonging to another eNB (or to another PLMN), or a preconfigured carrier that is used for public safety operations). The resource pool configurations for transmitting and monitoring on a non-PCell carrier can be provided by a variety of sources. The sources of the resource pool configurations may vary depending on whether TDD or FDD is being used. For example, when TDD is used, the resource pool configurations can be provided either by the particular discovery carrier itself via system information or via a serving cell in the serving eNB with dedicated signaling or broadcast signaling. When FDD is used, the resource pool configurations can be provided either by a paired carrier associated with the particular discovery carrier via broadcast signaling (e.g., system information) or via a serving cell in the serving eNB with dedicated signaling or broadcast signaling. Thus, it is desirable to have coordination between different eNBs or PLMNs to allow the serving eNB to provide resource pool configurations for transmitting and/or monitoring on other carriers that do not belong to the serving eNB to which the UE is connected or on which the UE is camping.

In inter-carrier discovery, the serving eNB is allowed to provide dedicated or broadcasted reception/transmission (RX/TX) resource pool configurations for multiple carriers. As used herein, the RX/TX resource pool is a term for one or more information elements in RRC together comprising a configuration that carries information about which resource elements and subframes the UE monitors for incoming discovery messages and uses to transmit outgoing discovery messages. It applies to a specific carrier frequency with a certain bandwidth, and may also contain information such as the cyclic prefix length, the number of retransmissions of each discovery message, the TDD-configuration (if TDD is used), and parameters related to synchronization. An example of the RX/TX resource pool is the information element SL-DiscResourcePool-r12 described in 3GPP TS 36.331 v12.6.0.

As described above, in Release 12 the RX/TX resource pool configuration for discovery carriers other than the PCell can be provided by the serving cell in which the UE is camping or connected, and by the particular discovery carrier (in cases in which TDD is used) or by the paired carrier associated with the particular discovery carrier (in cases in which FDD is used). This can cause problems because the UE might receive concurrent and different resource pool provisioning from different sources for RX/TX applicable to the same discovery carrier. Thus, a number of issues need to be addressed. For example, in some cases (e.g., when TDD is used) the UE might receive a first RX/TX resource pool configuration from the serving eNB and a second RX/TX resource pool configuration from system information on the particular discovery carrier in question. As another example, in some cases (e.g., when FDD is used) the UE might receive a first RX/TX resource pool configuration from the serving eNB and a second RX/TX resource pool configuration from system information on the paired carrier associated with the particular discovery carrier.

How the different scenarios that may arise should be handled by the UE has not yet been defined in the 3GPP standards. A standardized rule is needed, however, in order to avoid UE misbehavior that could affect network performance. For example, it has not been defined which resource pool configuration the UE should prioritize for the particular discovery carrier in question (e.g., the one received via the serving eNB or the one received from system information via either the particular discovery carrier in question or the paired carrier associated with the particular discovery carrier, depending on whether TDD or FDD is used). Similarly, in a scenario where the UE receives the RX/TX resource pool configuration from the serving eNB, but no system information is transmitted on the particular discovery carrier in question (or the paired carrier associated with the particular discovery carrier in question), it has not been defined whether the UE should interpret this to mean the particular discovery carrier no longer supports ProSe discovery.

The present disclosure contemplates various embodiments that may advantageously prevent the UE misbehavior that could occur when the UE receives concurrent and different resource pool provisioning from different sources for transmission and/or reception applicable to the same discovery carrier.

In certain embodiments, the misbehavior that could occur when concurrent and different resource pool provisioning is received from different sources is prevented by a method in a wireless device. According to one example embodiment, the wireless device receives one or more resource pool configurations for a particular discovery carrier. The received one or more resource pool configurations include at least a first resource pool received from a serving network node of the wireless device. The one or more resource pool configurations include information indicating one or more resource elements and subframes that the wireless device should use to monitor for incoming discovery messages and transmit outgoing discovery messages. The wireless device determines which of the received one or more resource pool configurations that the wireless device should use to monitor for incoming discovery messages and transmit outgoing discovery messages.

In certain embodiments, the misbehavior that could occur when concurrent and different resource pool provisioning is received from different sources is prevented by a method in a network node. The network node determines a first resource pool configuration for a particular discovery carrier. The first resource pool configuration includes information indicating one or more of resource elements and subframes that a wireless device should use to monitor for incoming discovery messages and transmit outgoing discovery messages. The network node communicates the first resource pool configuration to the wireless device. The network node configures the wireless device to use one of the first resource pool configuration or a second resource pool configuration communicated via system information of the particular discovery carrier (when TDD is used) or the paired carrier associated with the particular discovery carrier (when FDD is used).

The various embodiments described herein may have one or more technical advantages. For example, certain embodiments may advantageously avoid UE misbehavior when the UE receives concurrent and different resource pool provisioning from different sources for transmission/reception applicable to the same discovery carriers. As another example, certain embodiments may reduce the amount of signaling that needs to be sent over the air, which may advantageously allow a UE to save battery because it does not need to continuously monitor system information from the particular discovery carrier. As still another example, the various embodiments described herein may be implemented in both systems using TDD and systems using FDD. Other advantages may be readily apparent to one having skill in the art. Certain embodiments may have none, some, or all of the recited advantages.

FIG. 1 is a block diagram illustrating an embodiment of a network 100, in accordance with certain embodiments. Network 100 includes one or more UE(s) 110 (which may be interchangeably referred to as wireless devices 110), and one or more network nodes 115 (which may be interchangeably referred to as eNBs 115). UEs 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information. UEs 110 and network nodes 115 may be capable of operating using TDD, FDD, or any other suitable mode of operation. In some embodiments, an area of wireless signal coverage associated with a network node 115 may be referred to as a cell. In some embodiments, UEs 110 may have D2D capability. Thus, UEs 110 may be able to receive signals from and/or transmit signals directly to another UE. For example, UE 110A may be able to receive signals from and/or transmit signals to UE 110D.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be performed by network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum (NAS) layer. In non-access stratum signaling, signals between UEs 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more UEs 110, and one or more different types of network nodes capable of communicating (directly or indirectly) with UEs 110.

In some embodiments, the non-limiting term UE is used. UEs 110 described herein can be any type of wireless device capable of communicating with network nodes 115 or another UE over radio signals. UE 110 may be a radio communication device, target device, D2D UE, machine-type-communication (MTC) UE or UE capable of machine-to-machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, translation node (e.g., PLAT) or any other suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 6-10.

Although FIG. 1 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

As described above, a UE, such as UE 110A in FIG. 1, may receive one or more RX/TX resource pool configurations for a particular discovery carrier (which may be interchangeably referred to herein as a "particular ProSe discovery carrier") from different sources. As one example, in cases where UE 110A uses TDD, the resource pool configuration for a particular discovery carrier may be provided to UE 110A from one or more of the serving cell in which the UE is camping or connected (e.g., network node 115A) and the particular discovery carrier itself (e.g., via system information).

As another example, in cases where UE 110A is using FDD, the resource pool configuration for a particular discovery carrier may be provided to UE 110A from one or more of the serving cell in which UE 110A is camping on or connected (e.g., network node 115A) and by a paired carrier associated with the particular discovery carrier (e.g., via system information). To illustrate, consider the following example scenario. In FDD mode, UE 110A can receive a first resource pool configuration from its serving network node, such as network node 115A. Serving network node 115A is responsible for FDD carrier F1, which consists of carriers F1d and F1u ("d" for downlink, "u" for uplink). Serving network node 115A transmits system information on carrier F1d which indicates which resources to use on a second carrier, F2u. In this example, F2u is the particular discovery carrier on which UE 110A monitors for incoming discovery messages and transmits outgoing discovery messages. F2u (and its paired carrier, F2d) are handled by another non-serving network node, such as network node 115B in FIG. 1. Network node 115B broadcasts its system information on the paired carrier (i.e., F2d) associated with the particular discovery carrier (i.e., F2u). The system information broadcasted on paired carrier F2d indicates which resources to use on the particular discovery carrier F2u. Thus, UE 110A operating in FDD mode can receive a first resource pool configuration for the particular discovery carrier (i.e., F2u in this example) from serving network node 115A (via carrier F1d), and a second resource pool configuration for the particular discovery carrier (i.e., F2u) from non-serving network node 115B (e.g., via system information on the paired carrier associated with the particular discovery carrier).

This can cause problems because UE 110A might receive concurrent and different resource pool provisioning from different sources for RX/TX applicable to the same discovery carrier. In certain embodiments, the problems that can occur when UE 110A receives concurrent and different resource pool configurations from different sources for transmission and/or reception may be prevented by configuring UE 110A to use a particular resource pool configuration in a particular scenario. Examples of how a network node, such as network node 115A, can configure UE 110A to use a particular resource pool configuration in a particular scenario are described in more detail below with respect to FIGS. 3 and 5. UE 110A can then determine which of the received one or more resource pool configurations UE 110A should use to monitor for incoming discovery messages and transmit outgoing discovery messages.

As used herein, system information refers generally to any signaling suitable to convey a resource pool configuration for a particular discovery carrier to a UE. For example, in certain embodiments the system information may be SIB19. Although the various embodiments may be described using SIB19 as an example of the system information, the present disclosure contemplates that the system information used to convey a resource pool configuration for a particular discovery carrier to a UE may vary according to particular limitations, and the system information described herein is not limited to SIB19.

Furthermore, although certain embodiments are described using particular examples involving UE 110A, serving network node 115A, and non-serving network node 115B, the various embodiments described herein are not limited to such an example arrangement.

According to one example embodiment, UE 110A receives one or more resource pool configurations for a particular discovery carrier. The received one or more resource pool configurations include at least a first resource pool configuration received from serving network node 115A of UE 110A. In some cases, such as when UE 110A uses TDD, UE 110A determines whether the received one or more resource pool configurations include a second resource pool configuration received via system information (e.g., SIB19) of the particular discovery carrier. In some cases, such as when UE 110A uses FDD, UE 110A determines whether the received one or more resource pool configurations for the particular discovery carrier includes a second resource pool configuration received via system information (e.g., SIB19) of a paired carrier associated with the particular discovery carrier.

In either case, UE 110A may determine that it has received a second resource pool configuration (either via system information of the particular discovery carrier, or via system information of the paired carrier associated with the particular discovery carrier, depending on whether UE 110A uses TDD or FDD, respectively). This may occur because network node 115A (to which UE 110A is connected or camping on) might have bad coordination with the particular discovery carrier that may be managed by non-serving network node 115B in the same PLMN or another network node 115 in another PLMN. The bad coordination might be due to a variety of factors, such as one or more of unreliability, misbehavior, and speed of the coordination interface (e.g., the X2 or S1 interface).

Upon determining that the received one or more resource pool configurations for the particular discovery carrier includes the second resource pool configuration, UE 110A uses the second resource pool configuration to monitor for incoming discovery messages and transmit outgoing discovery messages. Thus, UE 110A uses the second resource pool configuration to monitor for incoming discovery messages and transmit outgoing discovery messages instead of the first resource pool configuration provided for the particular discovery carrier in question by the serving cell (i.e., network node 115A) via broadcast or dedicated signaling.

According to another example embodiment, UE 110A receives one or more resource pool configurations for the particular discovery carrier. The received one or more resource pool configurations include at least a first resource pool configuration received from serving network node 115A of UE 110A. In cases where UE 110A uses TDD, UE 110A determines whether the particular discovery carrier contains system information. In cases where UE 110A uses FDD, UE 110A determines whether the paired carrier associated with the particular discovery carrier contains system information. UE 110A may determine that the particular discovery carrier in which UE 110A would like to transmit discovery messages does not contain system information (in cases where TDD is used), or may determine that the paired carrier associated with the particular discovery carrier does not contain system information (in cases where FDD is used). This may, for example, be due to the fact that the particular discovery carrier no longer supports ProSe discovery. Upon determining that the particular discovery carrier (or the paired carrier associated with the particular discovery carrier, depending on the mode of operation used) does not contain system information, UE 110A determines whether UE 110A is located at a cell edge between in-coverage and out-of-coverage for the particular discovery carrier.

Upon determining that UE 110A is not located at a cell edge between in-coverage and out-of-coverage for the particular discovery carrier, UE 110A determines that the first resource pool configuration received from serving network node 115A of UE 110A should not be used to monitor for incoming discovery messages and transmit outgoing discovery messages. Therefore, UE 110A does not use the resource pool configuration provided by the serving cell, and no ProSe Discovery is performed on the particular discovery carrier. This is referred to herein as behavior A.

In another scenario, however, UE 110A may not receive system information because UE 110A is located on the cell edge between in-coverage and out-of-coverage for that particular discovery carrier. In such a case, UE 110A might not be able to read system information from that particular ProSe discovery carrier for a short period of time. Upon determining that UE 110A is located at a cell edge between in-coverage and out-of-coverage for the particular discovery carrier, UE 110A uses the first resource pool configuration received from serving network node 115A of UE 110A to monitor for incoming discovery messages and transmit outgoing discovery messages. Thus, in this scenario, UE 110A uses the first resource pool configuration provided by serving network node 115A. This is referred to herein as behavior B.

The present disclosure contemplates that UE 110A may switch from behavior A to behavior B in any suitable manner. The determination of whether UE 110A is located at the cell edge between in-coverage and out-of-coverage for the particular discovery carrier, and thus the transition between behavior A and behavior B, may be based on any suitable criteria. For example, determining whether UE 110A is located at the cell edge between in-coverage and out-of-coverage for the particular discovery carrier may be based on whether system information is not received by UE 110A for a particular duration. In certain embodiments, switching between behavior A and B may be based on a timer. As one example, a timer can be configured by the network or preconfigured by UE 110A such that if system information is not read for a certain period, UE 110A can continue to use the resources provided by serving network node 115A to which UE 110A is still connected (i.e., behavior B).

In certain embodiments, determining whether UE 110A is located at the cell edge between in-coverage and out-of-coverage for the particular discovery carrier may be based on whether an S-criterion is not fulfilled for a second duration. The S-criterion, which is defined in 3GPP TS 36.304 v12.5.0 section 5.2.3.2, is used to determine when UE 110A is out-of-coverage or in-coverage with respect to the particular discovery carrier. For example, in switching between behavior A and B UE 110A may apply a timer to the S-criterion. If the S-criterion has not been fulfilled for a certain time, the particular discovery carrier is declared out-of-coverage and UE 110A switches from behavior B to A (i.e., UE 110A does not use the first resource pool configuration provided by serving network node 115). Otherwise, before the timer expires UE 110A follows behavior B (even though the system information from the particular discovery carrier cannot be detected).

According to another example embodiment, UE 110A receives one or more resource pool configurations for a particular discovery carrier. The received one or more resource pool configurations include at least a first resource pool configuration received from serving network node 115A of UE 110A. In cases where TDD is used, UE 110A determines whether system information of the particular discovery carrier is broadcast at all. In cases where FDD is used, UE 110A determines whether system information of the paired carrier associated with the particular discovery carrier is broadcast at all.

In cases where TDD is used, UE 110A may determine that the particular ProSe discovery carrier supports ProSe discovery, but no system information is broadcasted. In cases where FDD is used, UE 110A may determine that the particular ProSe discovery carrier supports ProSe discovery, but no system information of the paired carrier associated with the particular discovery carrier is broadcast. Upon determining that system information of the particular discovery carrier is not broadcast (or that system information of the paired carrier associated with the particular discovery carrier is not broadcast, depending on whether UE 110A uses TDD or FDD), UE 110A uses the first resource pool configuration received from serving network node 115A of UE 110A to monitor for incoming discovery messages and transmit outgoing discovery messages. Thus, in this scenario the serving cell provides the necessary resource pool configuration for transmission on the particular ProSe discovery carrier in question. Configuring the system in this manner can be useful for network performance because no signaling needs to be sent over the air, and UE 110A can save battery because it does not need to continuously monitor system information (e.g., SIB19) from the particular ProSe discovery carrier (or from the paired carrier associated with the particular ProSe discovery carrier, depending on whether TDD or FDD is used).

In such a scenario, UE 110A may not know if the system information from the particular ProSe discovery carrier is not broadcasted because of reasons related to the system configuration or due to misdetection. In certain embodiments, UE 110A receives an indication from serving network node 115A that the particular discovery carrier does not support system information (or receives an indication from serving network node 115A that the paired carrier associated with the particular discovery carrier does not support system information, depending on whether TDD or FDD is used). For example, the serving cell may signal as part of the dedicated and/or broadcast signaling that the particular ProSe discovery carrier (or the paired carrier associated with the particular discovery carrier in FDD mode) does not support system information (e.g., SIB19). Otherwise, UE 110A can understand that no signaling is provided by the particular ProSe discovery carrier (or the paired carrier associated with the particular ProSe discovery carrier) if no system information is received for some consecutive number of decoding attempts.

In certain embodiments, upon determining that system information of the particular discovery carrier (or that system information of the paired carrier associated with the particular discovery carrier) is broadcast, UE 110A determines whether the system information of the particular discovery carrier (or the system information of the paired carrier associated with the particular discovery carrier) includes a second resource pool configuration. For example, for a system operating using TDD, the particular ProSe discovery carrier may broadcast system information, but the second resource pool configuration may not be included. Similarly, for a system operating using FDD, the paired carrier associated with the particular discovery carrier may broadcast system information, but the second resource pool configuration may not be included. This can be done to limit the overhead of signaling. Upon determining that the system information of the particular discovery carrier (or the paired carrier associated with the particular discovery carrier when FDD mode is used) does not include the second resource pool configuration, UE 110A uses the first resource pool configuration received from serving network node 115A of UE 110A to monitor for incoming discovery messages and transmit outgoing discovery messages.

There might be cases in which system information (e.g., SIB19) or its content cannot be read because of misdetection. Therefore serving network node 115A can also signal as part of the dedicated and/or broadcast signaling that the particular ProSe discovery carrier does not provide resources for direct discovery transmission/reception. Otherwise, UE 110A can understand that no resources are provided by the particular ProSe discovery carrier if no resource pool configuration is included in system information for some consecutive number of decoding attempts.

Figure 2:
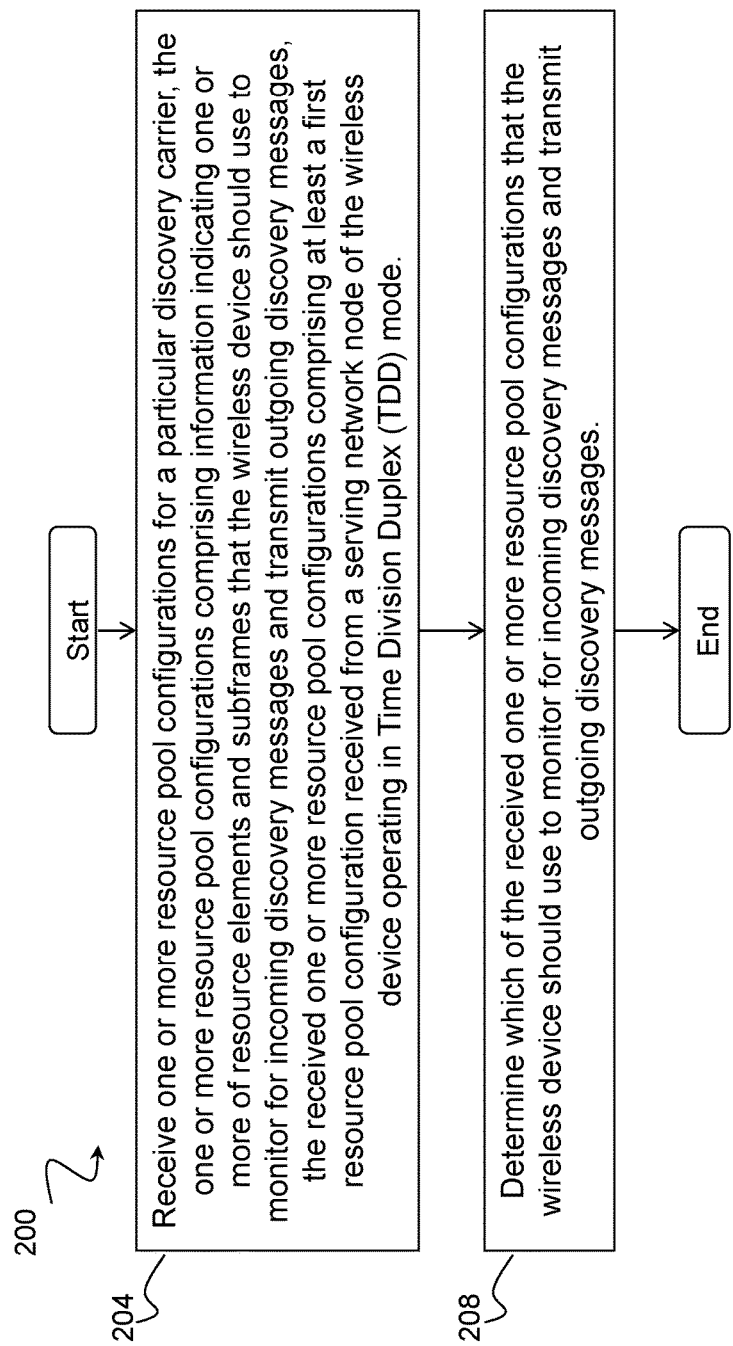
FIG. 2 is a flow diagram of a method in a wireless device, in accordance with certain embodiments.

FIG. 2 is a flow diagram of a method 200 in a wireless device, in accordance with certain embodiments. The method begins at step 204, where the wireless device receives one or more resource pool configurations for a particular discovery carrier, the one or more resource pool configurations comprising information indicating one or more of resource elements and subframes that the wireless device should use to monitor for incoming discovery messages and transmit outgoing discovery messages, the received one or more resource pool configurations comprising at least a first resource pool configuration received from a serving network node of the wireless device operating in Time Division Duplex (TDD) mode.

At step 208, the wireless device determines which of the received one or more resource pool configurations that the wireless device should use to monitor for incoming discovery messages and transmit outgoing discovery messages.

In certain embodiments, the method may comprise determining whether the received one or more resource pool configurations for the particular discovery carrier include a second resource pool configuration received via system information of the particular discovery carrier. In certain embodiments, the system information may comprise a session information block 19. In some cases, upon determining that the received one or more resource pool configurations for the particular discovery carrier includes the second resource pool configuration received via system information of the particular discovery carrier, the wireless device uses the second resource pool configuration to monitor for incoming discovery messages and transmit outgoing discovery messages.

In certain embodiments, the method may comprise determining whether the particular discovery carrier contains system information. Upon determining that the particular discovery carrier does not contain system information, the wireless device may determine whether the wireless device is located at a cell edge between in-coverage and out-of-coverage for the particular discovery carrier. In some cases, upon determining that the wireless device is not located at a cell edge between in-coverage and out-of-coverage for the particular discovery carrier, the wireless device determines that the first resource pool configuration received from the serving network node of the wireless device should not be used to monitor for incoming discovery messages and transmit outgoing discovery messages. In some cases, upon determining that the wireless device is located at a cell edge between in-coverage and out-of-coverage for the particular discovery carrier, the wireless device uses the first resource pool configuration received from the serving network node of the wireless device to monitor for incoming discovery messages and transmit outgoing discovery messages. In certain embodiments, determining whether the wireless device is located at the cell edge between in-coverage and out-of-coverage for the particular discovery carrier may be based on at least one of: whether system information is not received by the wireless device for a first duration; and whether an S-criterion used to determine when the wireless device is out-of-coverage or in-coverage with respect to the particular discovery carrier is not fulfilled for a second duration.

In certain embodiments, the method may comprise determining whether system information of the particular discovery carrier is broadcast. In some cases, upon determining that system information of the particular discovery carrier is not broadcast, the wireless device uses the first resource pool configuration received from the serving network node of the wireless device to monitor for incoming discovery messages and transmit outgoing discovery messages. In certain embodiments, the method may comprise receiving an indication from the serving network node that the particular discovery carrier does not support system information. In some cases, upon determining that system information of the particular discovery carrier is broadcast, the wireless device determines whether the system information of the particular discovery carrier includes a second resource pool configuration. In some cases, upon determining that the system information of the particular discovery carrier does not include the second resource pool configuration, the wireless device uses the first resource pool configuration received from the serving network node of the wireless device to monitor for incoming discovery messages and transmit outgoing discovery messages.

Figure 3:
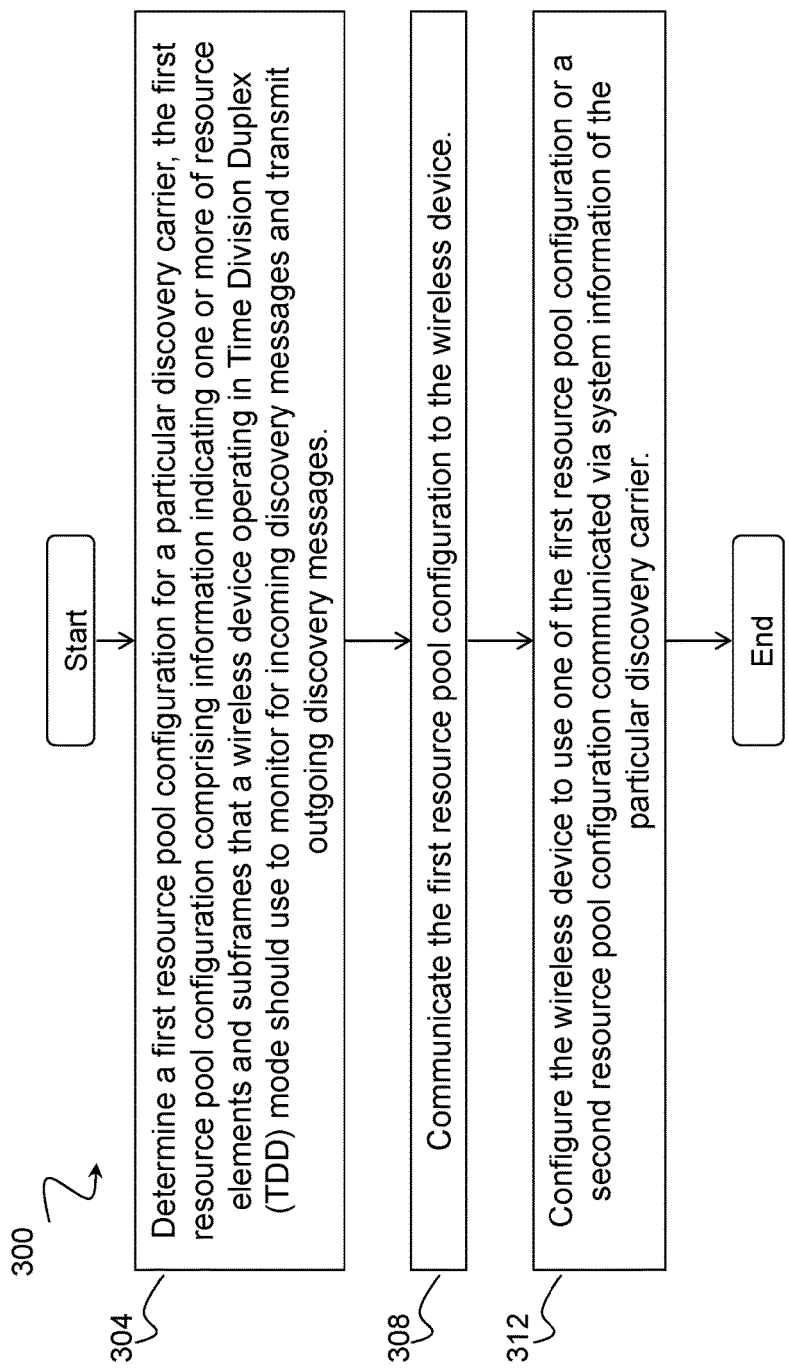
FIG. 3 is a flow diagram of a method in a network node, in accordance with certain embodiments.

FIG. 3 is a flow diagram of a method 300 in a network node, in accordance with certain embodiments. The method begins at step 304, where the network node determines a first resource pool configuration for a particular discovery carrier, the first resource pool configuration comprising information indicating one or more of resource elements and subframes that a wireless device operating in Time Division Duplex (TDD) mode should use to monitor for incoming discovery messages and transmit outgoing discovery messages.

At step 308, the network node communicates the first resource pool configuration to the wireless device.

At step 312, the network node configures the wireless device to use one of the first resource pool configuration or a second resource pool configuration communicated via system information of the particular discovery carrier. In certain embodiments, the system information may comprise a session information block 19.

In certain embodiments, configuring the wireless device to use one of the first resource pool configuration or the second resource pool configuration may comprise configuring the wireless device to use the second resource pool configuration to monitor for incoming discovery messages and transmit outgoing discovery messages if the wireless device receives both the first resource pool configuration and the second resource pool configuration.

In certain embodiments, configuring the wireless device to use one of the first resource pool configuration or the second resource pool configuration may comprise configuring the wireless device to not use the first resource pool configuration to monitor for incoming discovery messages and transmit outgoing discovery messages if the particular discovery carrier does not contain system information and the wireless device is not located at a cell edge between in-coverage and out-of-coverage for the particular discovery carrier.

In certain embodiments, configuring the wireless device to use one of the first resource pool configuration or the second resource pool configuration may comprise configuring the wireless device to use the first resource pool configuration to monitor for incoming discovery messages and transmit outgoing discovery messages if the particular discovery carrier does not contain system information and the wireless device is located at a cell edge between in-coverage and out-of-coverage for the particular discovery carrier.

In certain embodiments, configuring the wireless device to use one of the first resource pool configuration or the second resource pool configuration may comprise configuring the wireless device to use the first resource pool configuration to monitor for incoming discovery messages and transmit outgoing discovery messages if system information of the particular discovery carrier is not broadcast. In certain embodiments, the method may comprise communicating an indication to the wireless device that the particular discovery carrier does not support system information.

In certain embodiments, configuring the wireless device to use one of the first resource pool configuration or the second resource pool configuration may comprise configuring the wireless device to use the first resource pool configuration to monitor for incoming discovery messages and transmit outgoing discovery messages if the system information of the particular discovery carrier is broadcast but does not include the second resource pool configuration.

Figure 4:
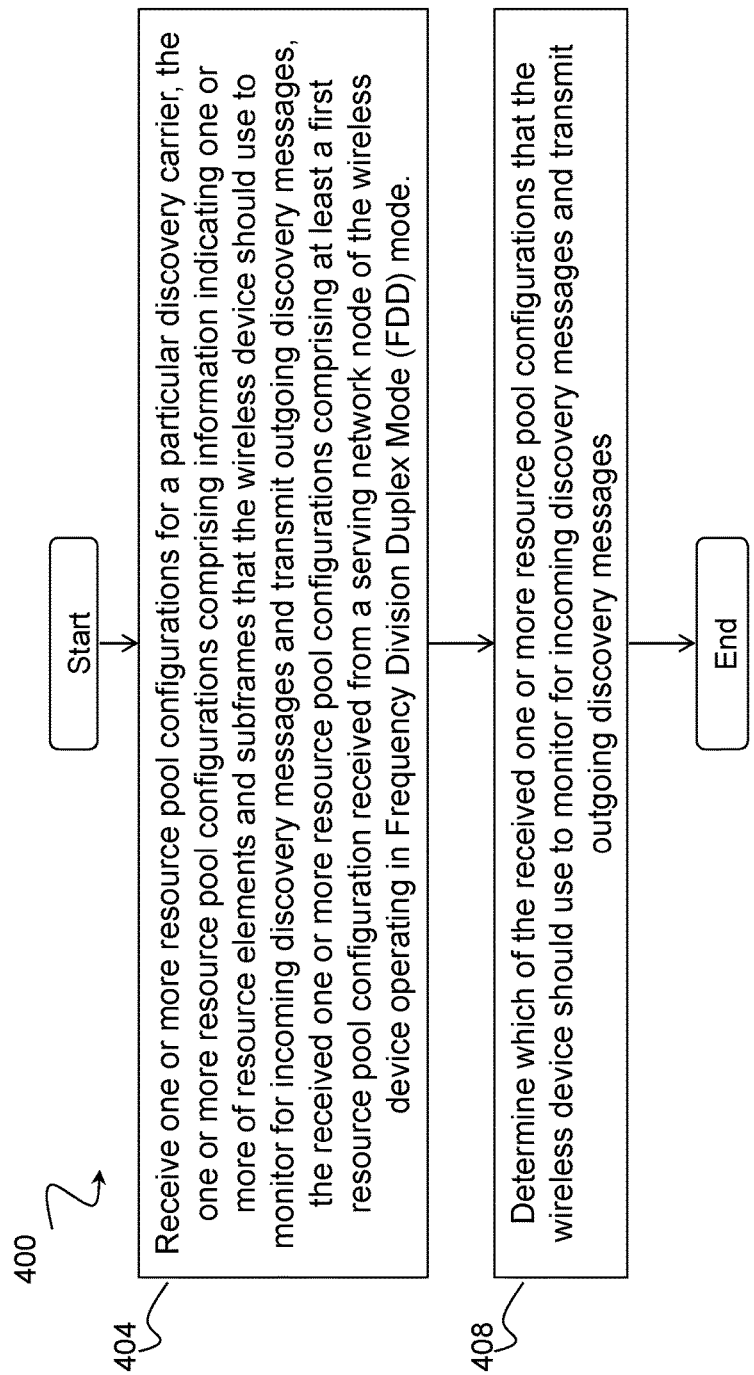
FIG. 4 is a flow diagram of a method in a wireless device, in accordance with certain embodiments.

FIG. 4 is a flow diagram of a method 400 in a wireless device, in accordance with certain embodiments. The method begins at step 404, where the wireless device receives one or more resource pool configurations for a particular discovery carrier, the one or more resource pool configurations comprising information indicating one or more of resource elements and subframes that the wireless device should use to monitor for incoming discovery messages and transmit outgoing discovery messages, the received one or more resource pool configurations comprising at least a first resource pool configuration received from a serving network node of the wireless device operating in Frequency Division Duplex Mode (FDD) mode.

At step 408, the wireless device determines which of the received one or more resource pool configurations that the wireless device should use to monitor for incoming discovery messages and transmit outgoing discovery messages.

In certain embodiments, the method may comprise determining whether the received one or more resource pool configurations for the particular discovery carrier includes a second resource pool configuration received via system information of a paired carrier associated with the particular discovery carrier. In certain embodiments, the system information may comprise a session information block 19. In some cases, upon determining that the received one or more resource pool configurations for the particular discovery carrier includes the second resource pool configuration received via system information of the paired carrier associated with the particular discovery carrier, the wireless device uses the second resource pool configuration to monitor for incoming discovery messages and transmit outgoing discovery messages.

In certain embodiments, the method may comprise determining whether the paired carrier associated with the particular discovery carrier contains system information. Upon determining that the paired carrier associated with the particular discovery carrier does not contain system information, the wireless device may determine whether the wireless device is located at a cell edge between in-coverage and out-of-coverage for the particular discovery carrier. In some cases, upon determining that the wireless device is not located at a cell edge between in-coverage and out-of-coverage for the particular discovery carrier, the wireless device determines that the first resource pool configuration received from the serving network node of the wireless device should not be used to monitor for incoming discovery messages and transmit outgoing discovery messages. In some cases, upon determining that the wireless device is located at a cell edge between in-coverage and out-of-coverage for the particular discovery carrier, the wireless device uses the first resource pool configuration received from the serving network node of the wireless device to monitor for incoming discovery messages and transmit outgoing discovery messages. In certain embodiments, determining whether the wireless device is located at the cell edge between in-coverage and out-of-coverage for the particular discovery carrier may be based on at least one of: whether system information is not received by the wireless device for a first duration; and whether an S-criterion used to determine when the wireless device is out-of-coverage or in-coverage with respect to the particular discovery carrier is not fulfilled for a second duration.

In certain embodiments, the method may comprise determining whether system information of a paired carrier associated with the particular discovery carrier is broadcast. In some cases, upon determining that system information of the paired carrier associated with the particular discovery carrier is not broadcast, the wireless device uses the first resource pool configuration received from the serving network node of the wireless device to monitor for incoming discovery messages and transmit outgoing discovery messages. In certain embodiments, the method may comprise receiving an indication from the serving network node that the paired carrier associated with the particular discovery carrier does not support system information. In some cases, upon determining that system information of the paired carrier associated with the particular discovery carrier is broadcast, the wireless device determines whether the system information of the paired carrier associated with the particular discovery carrier includes a second resource pool configuration. In some cases, upon determining that the system information of the paired carrier associated with the particular discovery carrier does not include the second resource pool configuration, the wireless device uses the first resource pool configuration received from the serving network node of the wireless device to monitor for incoming discovery messages and transmit outgoing discovery messages.

Figure 5:
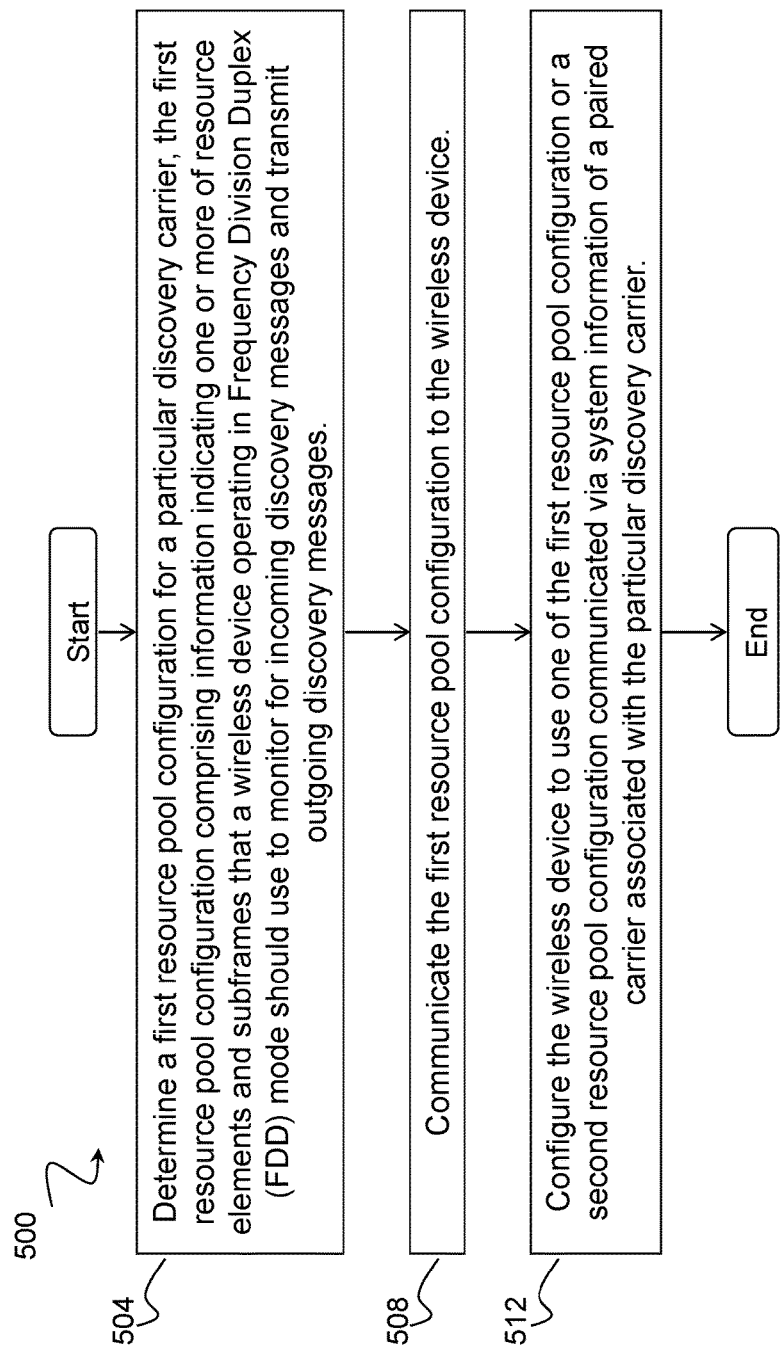
FIG. 5 is a flow diagram of a method in a network node, in accordance with certain embodiments.

FIG. 5 is a flow diagram of a method 500 in a network node, in accordance with certain embodiments. The method begins at step 504, where the network node determines a first resource pool configuration for a particular discovery carrier, the first resource pool configuration comprising information indicating one or more of resource elements and subframes that a wireless device operating in Frequency Division Duplex (FDD) mode should use to monitor for incoming discovery messages and transmit outgoing discovery messages.

At step 508, the network node communicates the first resource pool configuration to the wireless device.

At step 512, the network node configures the wireless device to use one of the first resource pool configuration or a second resource pool configuration communicated via system information of a paired carrier associated with the particular discovery carrier. In certain embodiments, the system information may comprise a session information block 19.

In certain embodiments, configuring the wireless device to use one of the first resource pool configuration or the second resource pool configuration may comprise configuring the wireless device to use the second resource pool configuration to monitor for incoming discovery messages and transmit outgoing discovery messages if the wireless device receives both the first resource pool configuration and the second resource pool configuration.

In certain embodiments, configuring the wireless device to use one of the first resource pool configuration or the second resource pool configuration may comprise configuring the wireless device to not use the first resource pool configuration to monitor for incoming discovery messages and transmit outgoing discovery messages if the paired carrier associated with the particular discovery carrier does not contain system information and the wireless device is not located at a cell edge between in-coverage and out-of-coverage for the particular discovery carrier.

In certain embodiments, configuring the wireless device to use one of the first resource pool configuration or the second resource pool configuration may comprise configuring the wireless device to use the first resource pool configuration to monitor for incoming discovery messages and transmit outgoing discovery messages if the paired carrier associated with the particular discovery carrier does not contain system information and the wireless device is located at a cell edge between in-coverage and out-of-coverage for the particular discovery carrier.

In certain embodiments, configuring the wireless device to use one of the first resource pool configuration or the second resource pool configuration may comprise configuring the wireless device to use the first resource pool configuration to monitor for incoming discovery messages and transmit outgoing discovery messages if system information of the paired carrier associated with the particular discovery carrier is not broadcast. In certain embodiments, the method may comprise communicating an indication to the wireless device that the paired carrier associated with the particular discovery carrier does not support system information.

In certain embodiments, configuring the wireless device to use one of the first resource pool configuration or the second resource pool configuration may comprise configuring the wireless device to use the first resource pool configuration to monitor for incoming discovery messages and transmit outgoing discovery messages if the system information of the paired carrier associated with the particular discovery carrier is broadcast but does not include the second resource pool configuration.

Figure 6:
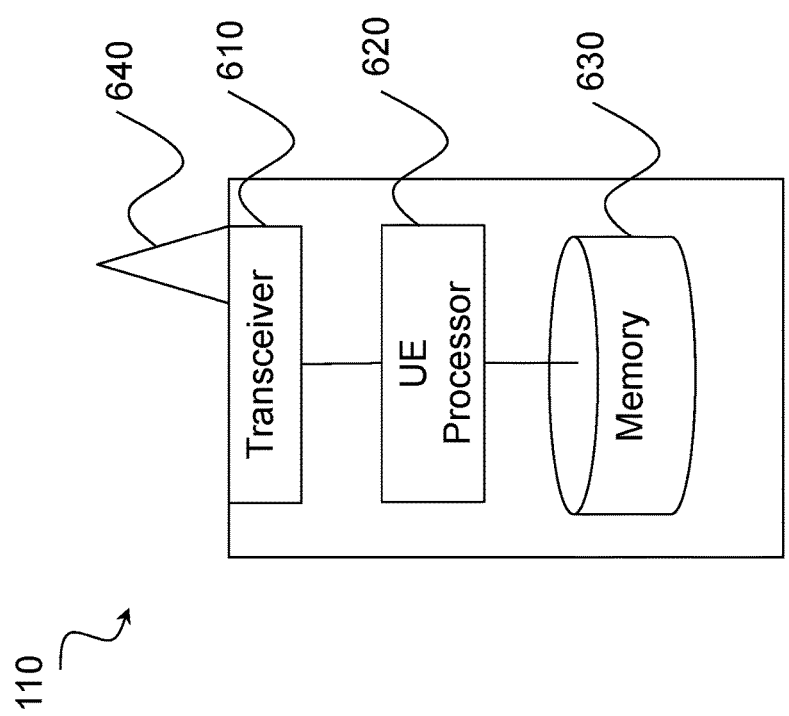
FIG. 6 is a schematic block diagram of an exemplary wireless device, in accordance with certain embodiments.

FIG. 6 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 610, processor 620, and memory 630. In some embodiments, transceiver 610 facilitates transmitting wireless signals to and receiving wireless signals from network node 115 (e.g., via antenna 640), processor 620 executes instructions to provide some or all of the functionality described above as being provided by wireless device 110, and memory 630 stores the instructions executed by processor 620.

Processor 620 may include any suitable combination of hardware and software implemented in one or more modules to execute instructions and manipulate data to perform some or all of the described functions of wireless device 110, such as the functions of wireless device 110 described above in relation to FIGS. 1-5. In some embodiments, processor 620 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 620.

Other embodiments of wireless device 110 may include additional components beyond those shown in FIG. 6 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 620. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 7:
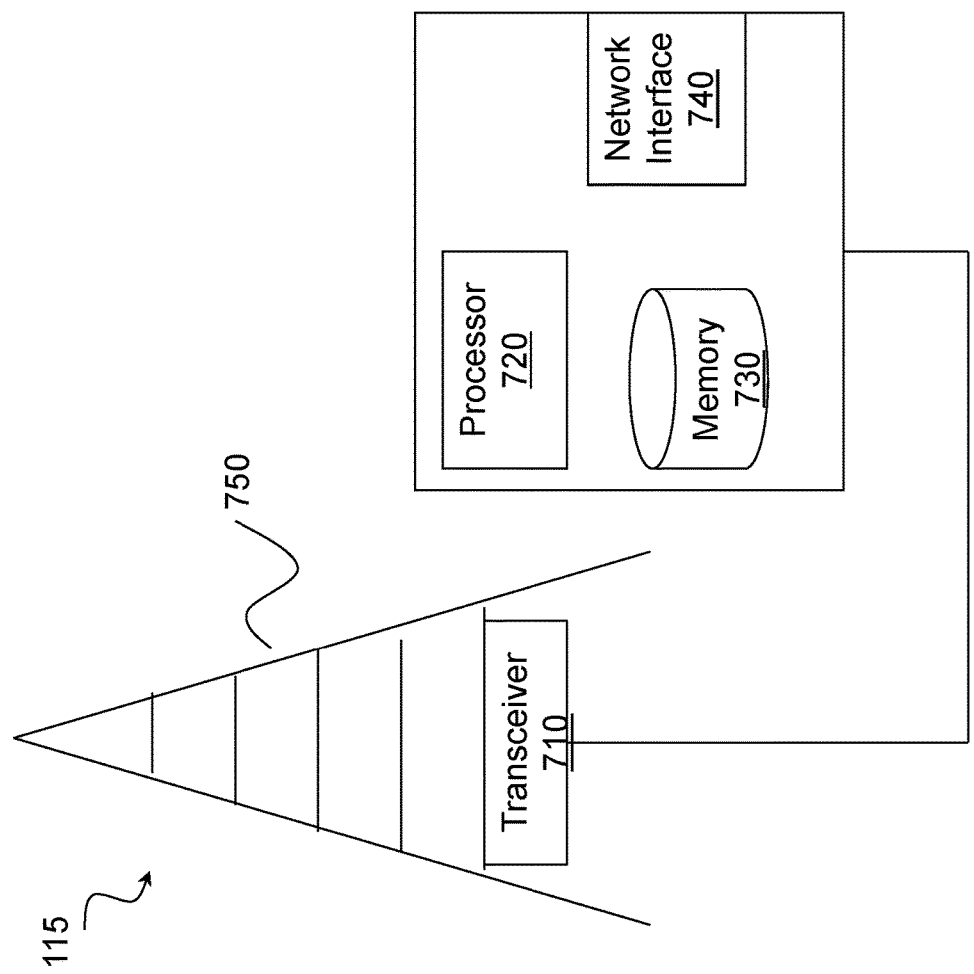
FIG. 7 is a schematic block diagram of an exemplary network node, in accordance with certain embodiments.

FIG. 7 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 710, processor 720, memory 730, and network interface 740. In some embodiments, transceiver 710 facilitates transmitting wireless signals to and receiving wireless signals from wireless device 110 (e.g., via antenna 750), processor 720 executes instructions to provide some or all of the functionality described above as being provided by a network node 115, memory 730 stores the instructions executed by processor 720, and network interface 740 communicates signals to backend network components, such as a gateway, switch, router, Internet, Public Switched Telephone Network (PSTN), core network nodes or radio network controllers 130, etc.

Processor 720 may include any suitable combination of hardware and software implemented in one or more modules to execute instructions and manipulate data to perform some or all of the described functions of network node 115, such as those described above in relation to FIGS. 1-5 above. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and may refer to any suitable device operable to receive input for network node 115, send output from network node 115, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of network node 115 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 8:
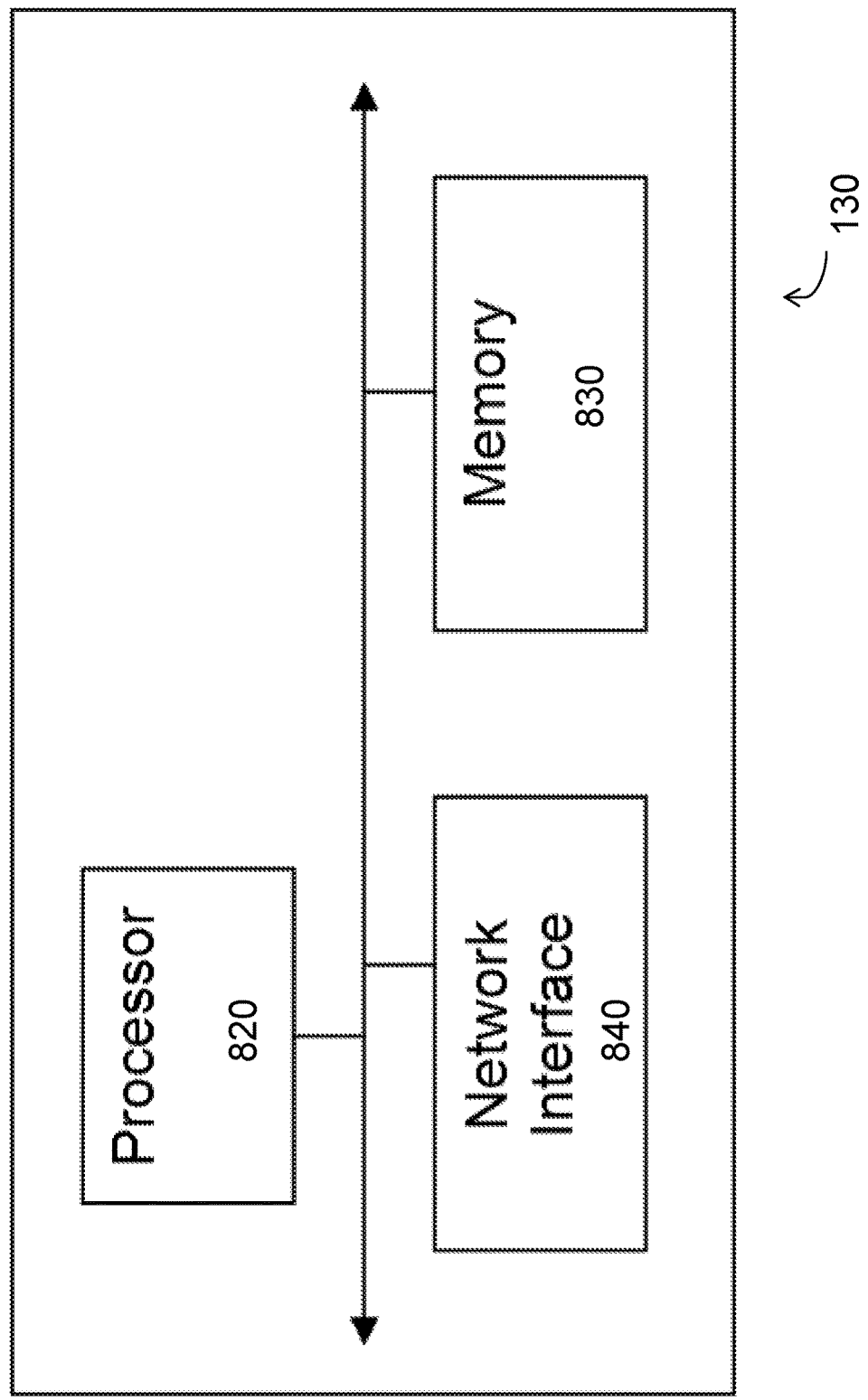
FIG. 8 is a schematic block diagram of an exemplary radio network controller or core network node, in accordance with certain embodiments.

FIG. 8 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 820, memory 830, and network interface 840. In some embodiments, processor 820 executes instructions to provide some or all of the functionality described above as being provided by the network node, memory 830 stores the instructions executed by processor 820, and network interface 840 communicates signals to any suitable node, such as a gateway, switch, router, Internet, Public Switched Telephone Network (PSTN), network nodes 115, radio network controllers or core network nodes 130, etc.

Processor 820 may include any suitable combination of hardware and software implemented in one or more modules to execute instructions and manipulate data to perform some or all of the described functions of the radio network controller or core network node 130. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the solution described above).

Figure 9:
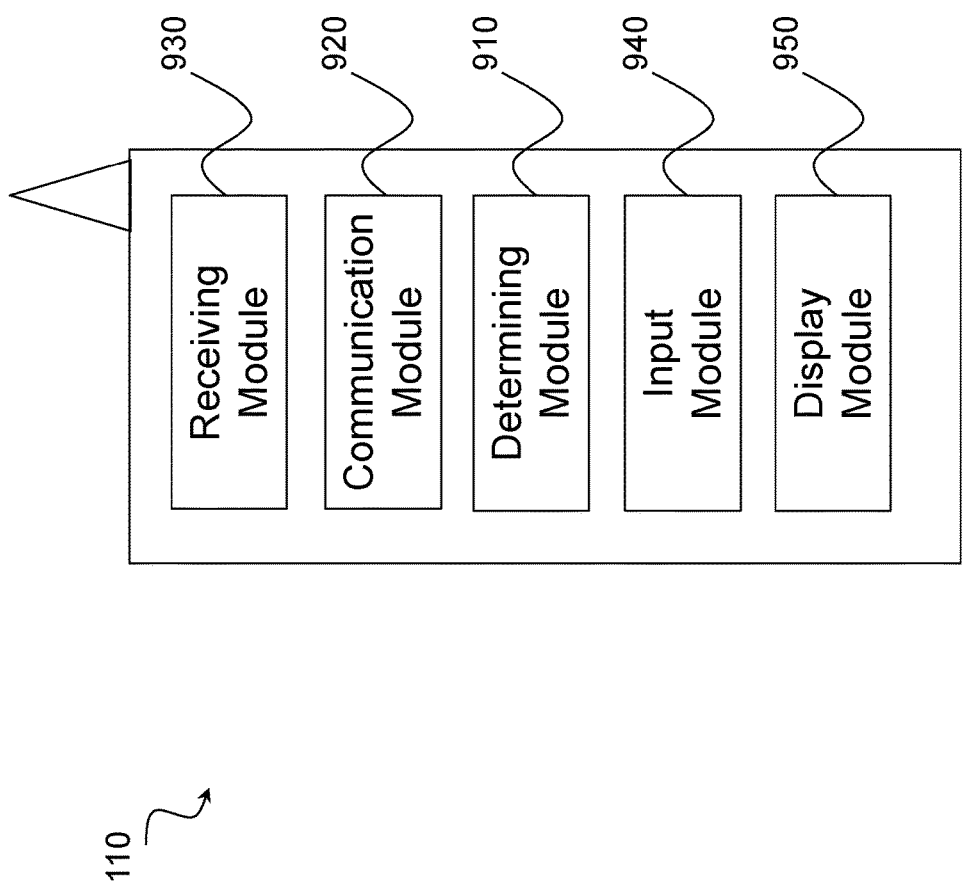
FIG. 9 is a block schematic of an exemplary wireless device, in accordance with certain embodiments.

FIG. 9 is a block schematic of an exemplary wireless device, in accordance with certain embodiments. Wireless device 110 may include one or more modules. For example, wireless device 110 may include a determining module 910, a communication module 920, a receiving module 930, an input module 940, a display module 950, and any other suitable modules. Wireless device 110 may perform the methods for provisioning transmission pools for inter-carrier ProSe direct discovery described above with respect to FIGS. 1-5.

Determining module 910 may perform the processing functions of wireless device 110. For example, in certain embodiments wireless device 110 may use TDD. In such a case, determining module 910 may determine which of the received one or more resource pool configurations that wireless device 110 should use to monitor for incoming discovery messages and transmit outgoing discovery messages. As another example, determining module 910 may determine whether the received one or more resource pool configurations for the particular discovery carrier include a second resource pool configuration received via system information of the particular discovery carrier. As another example, determining module 910 may determine whether the particular discovery carrier contains system information. As still another example, determining module 910 may determine whether system information of the particular discovery carrier is broadcast. As yet another example, determining module 910 may determine whether the system information of the particular discovery carrier includes a second resource pool configuration.

In certain embodiments, wireless device 110 may use FDD. In such a case, determining module 910 may determine which of the received one or more resource pool configurations that wireless device 110 should use to monitor for incoming discovery messages and transmit outgoing discovery messages. As another example, determining module 910 may determine whether the received one or more resource pool configurations for the particular discovery carrier include a second resource pool configuration received via system information of a paired carrier associated with the particular discovery carrier. As another example, determining module 910 may determine whether the paired carrier associated with the particular discovery carrier contains system information. As still another example, determining module 910 may determine whether system information of the paired carrier associated with the particular discovery carrier is broadcast. As yet another example, determining module 910 may determine whether the system information of the paired carrier associated with the particular discovery carrier includes a second resource pool configuration.

Determining module 910 may include or be included in one or more processors, such as processor 620 described above in relation to FIG. 6. Determining module 910 may include analog and/or digital circuitry configured to perform any of the functions of determining module 910 and/or processor 620 described above. The functions of determining module 910 described above may, in certain embodiments, be performed in one or more distinct modules.

Communication module 920 may perform the transmission functions of wireless device 110. Communication module 920 may transmit messages to one or more of network nodes 115 of network 100. Communication module 920 may include a transmitter and/or a transceiver, such as transceiver 610 described above in relation to FIG. 6. Communication module 920 may include circuitry configured to wirelessly transmit messages and/or signals. In particular embodiments, communication module 920 may receive messages and/or signals for transmission from determining module 910. In certain embodiments, the functions of communication module 920 described above may be performed in one or more distinct modules.

Receiving module 930 may perform the receiving functions of wireless device 110. In certain embodiments, wireless device 110 may use TDD. In such a case, receiving module 930 may receive one or more resource pool configurations for a particular discovery carrier, the one or more resource pool configurations comprising information indicating one or more of resource elements and subframes that wireless device 110 should use to monitor for incoming discovery messages and transmit outgoing discovery messages, the received one or more resource pool configurations comprising at least a first resource pool configuration received from a serving network node of wireless device 110 operating in TDD mode. As another example, receiving module 930 may receive an indication from the serving network node that the particular discovery carrier does not support system information.

In certain embodiments, wireless device 110 may use FDD. In such a case, receiving module 930 may receive one or more resource pool configurations for a particular discovery carrier, the one or more resource pool configurations comprising information indicating one or more of resource elements and subframes that wireless device 110 should use to monitor for incoming discovery messages and transmit outgoing discovery messages, the received one or more resource pool configurations comprising at least a first resource pool configuration received from a serving network node of wireless device 110 operating in FDD mode. As another example, receiving module 930 may receive an indication from the serving network node that the paired carrier associated with the particular discovery carrier does not support system information.

Receiving module 930 may include a receiver and/or a transceiver, such as transceiver 610 described above in relation to FIG. 6. Receiving module 930 may include circuitry configured to wirelessly receive messages and/or signals. In particular embodiments, receiving module 930 may communicate received messages and/or signals to determining module 910.

Input module 940 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 910.

Display module 950 may present signals on a display of wireless device 110. Display module 950 may include the display and/or any appropriate circuitry and hardware configured to present signals on the display. Display module 950 may receive signals to present on the display from determining module 910.

Determining module 910, communication module 920, receiving module 930, input module 940, and display module 950 may include any suitable configuration of hardware and/or software. Wireless device 110 may include additional modules beyond those shown in FIG. 9 that may be responsible for providing any suitable functionality, including any of the functionality described above and/or any additional functionality (including any functionality necessary to support the various solutions described herein).

Figure 10:
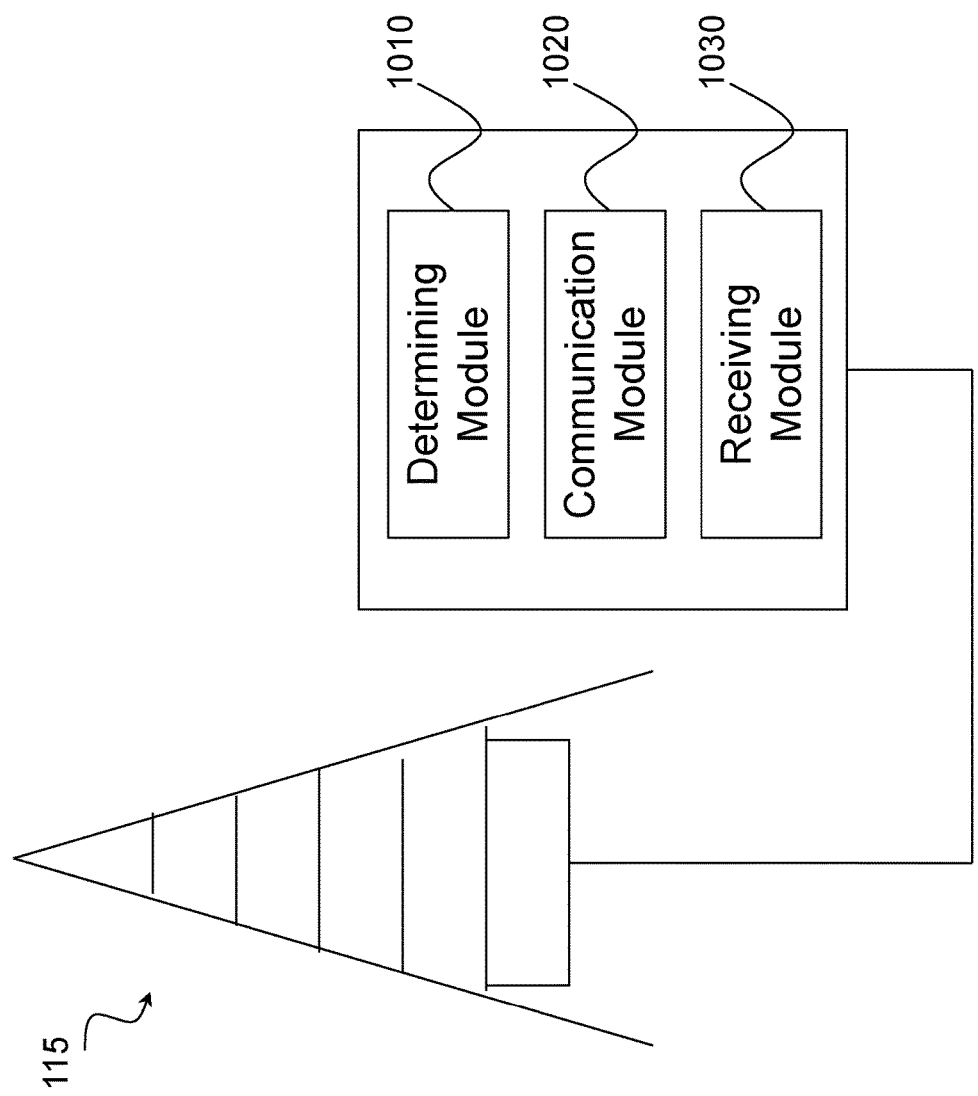
FIG. 10 is a block schematic of an exemplary network node, in accordance with certain embodiments.

FIG. 10 is a block schematic of an exemplary network node 115, in accordance with certain embodiments. Network node 115 may include one or more modules. For example, a network node 115 may include determining module 1010, communication module 1020, receiving module 1030, and any other suitable modules. In some embodiments, one or more of determining module 1010, communication module 1020, receiving module 1030, or any other suitable module may be implemented using one or more processors, such as processor 720 described above in relation to FIG. 7. In certain embodiments, the functions of two or more of the various modules may be combined into a single module. Network node 115 may perform the methods for provisioning transmission pools for inter-carrier ProSe direct discovery described above with respect to FIGS. 1-5.

Determining module 1010 may perform the processing functions of network node 115. In certain embodiments, network node 115 may use TDD. In such a case, determining module 1010 may determine a first resource pool configuration for a particular discovery carrier, the first resource pool configuration comprising information indicating one or more of resource elements and subframes that a wireless device operating in TDD mode should use to monitor for incoming discovery messages and transmit outgoing discovery messages. As another example, determining module 1010 may configure the wireless device to use one of the first resource pool configuration or a second resource pool configuration communicated via system information of the particular discovery carrier.

In certain embodiments, network node 115 may use FDD. In such a case, determining module 1010 may determine a first resource pool configuration for a particular discovery carrier, the first resource pool configuration comprising information indicating one or more of resource elements and subframes that a wireless device operating in FDD mode should use to monitor for incoming discovery messages and transmit outgoing discovery messages. As another example, determining module 1010 may configure the wireless device to use one of the first resource pool configuration or a second resource pool configuration communicated via system information of a paired carrier associated with the particular discovery carrier.

Determining module 1010 may include or be included in one or more processors, such as processor 720 described above in relation to FIG. 7. Determining module 1010 may include analog and/or digital circuitry configured to perform any of the functions of determining module 1010 and/or processor 720 described above. The functions of determining module 1010 may, in certain embodiments, be performed in one or more distinct modules. For example, in certain embodiments some of the functionality of determining module 1010 may be performed by an allocation module.

Communication module 1020 may perform the transmission functions of network node 115. In certain embodiments, network node 115 may use TDD. In such a case, communication module 1020 may communicate the first resource pool configuration to the wireless device. As another example, communication module 1020 may communicate an indication to the wireless device that the particular discovery carrier does not support system information. In certain embodiments, network node 115 may use FDD. In such a case, communication module 1020 may communicate the first resource pool configuration to the wireless device. As another example, communication module 1020 may communicate an indication to the wireless device that the paired carrier associated with the particular discovery carrier does not support system information. Communication module 1020 may transmit messages to one or more of wireless devices 110. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010 or any other module.

Receiving module 1030 may perform the receiving functions of network node 115. Receiving module 1030 may receive any suitable information from a wireless device. Receiving module 1030 may include a receiver and/or a transceiver, such as transceiver 710 described above in relation to FIG. 7. Receiving module 1030 may include circuitry configured to wirelessly receive messages and/or signals. In particular embodiments, receiving module 1030 may communicate received messages and/or signals to determining module 1010 or any other suitable module.

Determining module 1010, communication module 1020, and receiving module 1030 may include any suitable configuration of hardware and/or software. Network node 115 may include additional modules beyond those shown in FIG. 10 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components.

Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
AP Access Point
BS Base Station
BSC Base Station Controller
BTS Base Transceiver Station
CDM Code Division Multiplexing
CPE Customer Premises Equipment
D2D Device-to-device
DAS Distributed Antenna System
DL Downlink
eNB evolved Node B
EPDCCH Enhanced Physical Downlink Control Channel
FDD Frequency Division Duplex
LAN Local Area Network
LEE Laptop Embedded Equipment
LME Laptop Mounted Equipment
LTE Long Term Evolution
M2M Machine-to-Machine
MAC Medium Access Control
MAN Metropolitan Area Network
MCE Multi-cell/multicast Coordination Entity
MCS Modulation and Coding Scheme
MSR Multi-standard Radio
NAS Non-Access Stratum
PCell Primary Cell
PDCCH Physical Downlink Control Channel
PDSCH Physical Downlink Shared Channel
PDU Protocol Data Unit
PRB Physical Resource Block
PSSCH Physical Sidelink Shared Channel
PSCCH Physical Sidelink Control Channel
PUSCH Physical Uplink Shared Channel
PUCCH Physical Uplink Control Channel
ProSe Proximity Service
PSTN Public Switched Telephone Network
RB Resource Block
RNC Radio Network Controller
RRC Radio Resource Control
RRH Remote Radio Head
RRU Remote Radio Unit
RSRP Reference Signal Received Power
RX Reception
SA Scheduling Assignment
SCell Secondary Cell
SFN System Frame Number
SIB System Information Block
TDD Time Division Duplex
TX Transmission
UE User Equipment
UL Uplink
WAN Wide Area Network

The invention claimed is:

1. A method in a wireless device, comprising:
receiving one or more resource pool configurations for a particular discovery carrier, the one or more resource pool configurations comprising information indicating one or more of resource elements and subframes that the wireless device should use to monitor for incoming discovery messages and transmit outgoing discovery messages, the received one or more resource pool configurations comprising at least a first resource pool configuration received from a serving network node of the wireless device operating in Time Division Duplex (TDD) mode;
determining which of the received one or more resource pool configurations that the wireless device should use to monitor for incoming discovery messages and transmit outgoing discovery messages;
determining whether the particular discovery carrier contains system information; and
upon determining that the particular discovery carrier does not contain system information, determining whether the wireless device is located at a location where the wireless device is unable to read system information for the particular discovery carrier for a period of time;
upon determining that the wireless device is not located at a location where the wireless device is unable to read system information for the particular discovery carrier for a period of time, determining that the first resource pool configuration received from the serving network node of the wireless device should not be used to monitor for incoming discovery messages and transmit outgoing discovery messages; and,
upon determining that the wireless device is located at a location where the wireless device is unable to read system information for the particular discovery carrier for a period of time, using the first resource pool configuration received from the serving network node of the wireless device to monitor for incoming discovery messages and transmit outgoing discovery messages.

2. A method in a wireless device, comprising:
receiving one or more resource pool configurations for a particular discovery carrier, the one or more resource pool configurations comprising information indicating one or more of resource elements and subframes that the wireless device should use to monitor for incoming discovery messages and transmit outgoing discovery messages, the received one or more resource pool configurations comprising at least a first resource pool configuration received from a serving network node of the wireless device operating in Time Division Duplex (TDD) mode;
determining which of the received one or more resource pool configurations that the wireless device should use to monitor for incoming discovery messages and transmit outgoing discovery messages;
determining whether system information of the particular discovery carrier is broadcast;
upon determining that the system information of the particular discovery carrier is not broadcast, using the first resource pool configuration received from the serving network node to monitor for incoming discovery messages and transmit outgoing discovery messages;

upon determining that the system information of the particular discovery carrier is broadcast, determining whether the system information of the particular discovery channel includes a second resource pool configuration, and upon determining that the system information of the particular discovery carrier does not include the second resource pool configuration, using the first resource pool configuration received from the serving network node to monitor for incoming discovery messages and transmit outgoing discovery messages; and, receiving an indication from the serving network node that the particular discovery carrier does not broadcast system information.

3. The method of claim 2, comprising:

upon determining that system information of the particular discovery carrier is not broadcast, using the first resource pool configuration received from the serving network node of the wireless device to monitor for incoming discovery messages and transmit outgoing discovery messages.

4. A wireless device, comprising:

one or more processors, the one or more processors configured to:

receive one or more resource pool configurations for a particular discovery carrier, the one or more resource pool configurations comprising information indicating one or more of resource elements and subframes that the wireless device should use to monitor for incoming discovery messages and transmit outgoing discovery messages, the received one or more resource pool configurations comprising at least a first resource pool configuration received from a serving network node of the wireless device operating in Time Division Duplex (TDD) mode;

determine which of the received one or more resource pool configurations that the wireless device should use to monitor for incoming discovery messages and transmit outgoing discovery messages;

determine whether system information of the particular discovery carrier is broadcast;

upon determining that the system information of the particular discovery carrier is not broadcast, use the first resource pool configuration received from the serving network node to monitor for incoming discovery messages and transmit outgoing discovery messages;

upon determining that the system information of the particular discovery carrier is broadcast, determine whether the system information of the particular discovery channel includes a second resource pool configuration, and upon determining that the system information of the particular discovery carrier does not include the second resource pool configuration, use the first resource pool configuration received from the serving network node to monitor for incoming discovery messages and transmit outgoing discovery messages; and, receive an indication from the serving network node that the particular discovery carrier does not broadcast system information.

5. The wireless device of claim 4, wherein the one or more processors are configured to:

upon determining that system information of the particular discovery carrier is not broadcast, use the first resource pool configuration received from the serving network node of the wireless device to monitor for incoming discovery messages and transmit outgoing discovery messages.

6. A method in a network node, comprising:

determining a first resource pool configuration for a particular discovery carrier, the first resource pool configuration comprising information indicating one or more of resource elements and subframes that a wireless device operating in Time Division Duplex (TDD) mode should use to monitor for incoming discovery messages and transmit outgoing discovery messages;

communicating the first resource pool configuration to the wireless device; and configuring the wireless device to use one of the first resource pool configuration or a second resource pool configuration communicated via system information of the particular discovery carrier;

wherein configuring the wireless device to use one of the first resource pool configuration or the second resource pool configuration comprises one of:

configuring the wireless device to not use the first resource pool configuration to monitor for incoming discovery messages and transmit outgoing discovery messages if the particular discovery carrier does not contain system information and the wireless device is not located at a location where the wireless device is unable to read system information for the particular discovery carrier for a short period of time; and configuring the wireless device to use the first resource pool configuration to monitor for incoming discovery messages and transmit outgoing discovery messages if the particular discovery carrier does not contain system information and the wireless device is located at a location where the wireless device is unable to read system information for the particular discovery carrier for a short period of time.

7. A network node, comprising:

one or more processors, the one or more processors configured to:

determine a first resource pool configuration for a particular discovery carrier, the first resource pool configuration comprising information indicating one or more of resource elements and subframes that a wireless device operating in Time Division Duplex (TDD) mode should use to monitor for incoming discovery messages and transmit outgoing discovery messages;

communicate the first resource pool configuration to the wireless device;

configure the wireless device to use one of the first resource pool configuration or a second resource pool configuration communicated via system information of the particular discovery carrier;

configure the wireless device to not use the first resource pool configuration to monitor for incoming discovery messages and transmit outgoing discovery messages if the particular discovery carrier does not contain system information and the wireless device is not located at a location where the wireless device is unable to read system information for the particular discovery carrier for a short period of time; and configure the wireless device to use the first resource pool configuration to monitor for incoming discovery messages and transmit outgoing discovery messages if the particular discovery carrier does not contain system information and the wireless device is located at a location where the wireless device is unable to read system information for the particular discovery carrier for a short period of time.

8. The method of claim 1, further comprising:
switching, based on whether system information is not received by the wireless device for a particular duration, from a behavior in which the wireless device should not use the first resource pool configuration received from the serving network node to monitor for incoming discovery messages and transmit outgoing discovery messages to a behavior in which the wireless device uses the first resource pool configuration received from the serving network node of the wireless device to monitor for incoming discovery messages and transmit outgoing discovery messages.

9. The method of claim 1, further comprising:
switching, based on determination that an S-criterion is not fulfilled for a particular duration, from a behavior in which the wireless device uses the first resource pool configuration received from the serving network node of the wireless device to monitor for incoming discovery messages and transmit outgoing discovery messages to a behavior in which the wireless device should not use the first resource pool configuration received from the serving network node to monitor for incoming discovery messages and transmit outgoing discovery messages.

10. A wireless device, comprising:
one or more processors, the one or more processors configured to:
receive one or more resource pool configurations for a particular discovery carrier, the one or more resource pool configurations comprising information indicating one or more of resource elements and subframes that the wireless device should use to monitor for incoming discovery messages and transmit outgoing discovery messages, the received one or more resource pool configurations comprising at least a first resource pool configuration received from a serving network node of the wireless device operating in Time Division Duplex (TDD) mode;
determine which of the received one or more resource pool configurations that the wireless device should use to monitor for incoming discovery messages and transmit outgoing discovery messages;
determine whether the particular discovery carrier contains system information; and
upon determining that the particular discovery carrier does not contain system information, determine whether the wireless device is located at a location where the wireless device is unable to read system information for the particular discovery carrier for a period of time;
upon determining that the wireless device is not located at a location where the wireless device is unable to read system information for the particular discovery carrier for a period of time, determine that the first resource pool configuration received from the serving network node of the wireless device should not be used to monitor for incoming discovery messages and transmit outgoing discovery messages; and,
upon determining that the wireless device is located at a location where the wireless device is unable to read system information for the particular discovery carrier for a period of time, use the first resource pool configuration received from the serving network node of the wireless device to monitor for incoming discovery messages and transmit outgoing discovery messages.

* * * * *